United States Patent
Lugil et al.

(10) Patent No.: US 7,386,005 B2
(45) Date of Patent: Jun. 10, 2008

(54) METHOD AND SYSTEM FOR HIGH-SPEED SOFTWARE RECONFIGURABLE CODE DIVISION MULTIPLE ACCESS COMMUNICATION

(75) Inventors: Nico Lugil, Rotselaat (BE); Eric Borghs, Geel (BE); Sebastien Louveaux, Sint-Lambrechts-Woluwe (BE); Carl Mertens, Brasschaat (BE); Lieven Philips, Aarsohot (BE); Jurgen Vandermot, Leuven (BE); Jan Vanhoof, Wijgntaal (BE)

(73) Assignee: Agilent Technologies Inc., Santa Clara, CA (US)

( * ) Notice: Subject to any disclaimer, the term of this patent is extended or adjusted under 35 U.S.C. 154(b) by 1137 days.

(21) Appl. No.: 09/992,669

(22) Filed: Nov. 13, 2001

(65) Prior Publication Data

US 2002/0196754 A1    Dec. 26, 2002

Related U.S. Application Data

(63) Continuation of application No. PCT/BE00/00053, filed on May 10, 2000.

(60) Provisional application No. 60/133,340, filed on May 10, 1999.

(51) Int. Cl.
*H04J 15/00*    (2006.01)
*H04B 7/00*    (2006.01)
*H04B 7/216*    (2006.01)
*H04J 1/00*    (2006.01)
*H04J 13/00*    (2006.01)

(52) U.S. Cl. .................. 370/464; 370/310; 370/342; 370/343; 370/441; 370/479; 370/480

(58) Field of Classification Search ............. 370/320, 370/335, 342, 441, 343, 479, 480, 464
See application file for complete search history.

(56) References Cited

U.S. PATENT DOCUMENTS

| 4,291,409 | A |   | 9/1981 | Weinberg et al. |
| 4,761,778 | A |   | 8/1988 | Hui |
| 4,817,146 | A | * | 3/1989 | Szczutkowski et al. ..... 380/261 |

(Continued)

FOREIGN PATENT DOCUMENTS

EP    0 511 139 A1    10/1992

(Continued)

OTHER PUBLICATIONS

Berrou et al., *Near Shannon Liimit Error—Correcting Coding and Decoding: Turbo-Codes* (1), Proceedings of the ICC93, Geneva, Switzerland, May 23-26, 1993.

(Continued)

*Primary Examiner*—Edan Orgad
*Assistant Examiner*—Blanche Wong

(57) ABSTRACT

A communication device for W-CDMA signal transmission and reception has a W-CDMA transmitter having at least one of a first RAM and first registers, wherein the transmitter is configured to operate in accordance with first parameters. Further, the communication device has a W-CDMA receiver having at least one of a second RAM and second registers, wherein the receiver is configured to operate in accordance with second parameters, and signal acquisition component. A processor is in data communication with the W-CDMA transmitter, the W-CDMA receiver and the signal acquisition component, and configured to provide for software configuration of the first and second parameters.

28 Claims, 21 Drawing Sheets

U.S. PATENT DOCUMENTS

| | | | |
|---|---|---|---|
| 5,327,455 A | | 7/1994 | De Gaudenzi et al. |
| 5,327,467 A | | 7/1994 | De Gaudenzi et al. |
| 5,345,472 A | * | 9/1994 | Lee .......................... 370/342 |
| 5,406,570 A | | 4/1995 | Berrou et al. |
| 5,511,067 A | * | 4/1996 | Miller ........................ 370/335 |
| 5,559,828 A | * | 9/1996 | Armstrong et al. ......... 375/130 |
| 5,606,575 A | * | 2/1997 | Williams .................... 375/219 |
| 5,675,609 A | * | 10/1997 | Johnson ..................... 375/237 |
| 5,734,962 A | | 3/1998 | Hladik et al. |
| 5,742,637 A | | 4/1998 | Kanterakis et al. |
| 5,812,607 A | * | 9/1998 | Hutchinson et al. ........ 375/322 |
| 5,825,327 A | | 10/1998 | Krasner |
| 5,872,810 A | | 2/1999 | Philips et al. |
| 5,950,127 A | | 9/1999 | Nitta et al. |
| 5,982,807 A | | 11/1999 | Snell |
| 5,995,537 A | | 11/1999 | Kondo |
| 6,009,325 A | * | 12/1999 | Retzer et al. ............... 455/434 |
| 6,031,833 A | * | 2/2000 | Fickes et al. ............... 370/349 |
| 6,081,697 A | | 6/2000 | Haartsen |
| 6,097,974 A | | 8/2000 | Camp, Jr. et al. |
| 6,108,317 A | | 8/2000 | Jones et al. |
| 6,122,291 A | * | 9/2000 | Robinson et al. ........... 370/468 |
| 6,125,266 A | * | 9/2000 | Matero et al. .............. 455/126 |
| 6,141,373 A | | 10/2000 | Scott |
| 6,208,292 B1 | | 3/2001 | Sih et al. |
| 6,208,844 B1 | | 3/2001 | Abdelgany |
| 6,219,341 B1 | | 4/2001 | Varanasi |
| 6,252,917 B1 | | 6/2001 | Freeman |
| 6,272,168 B1 | | 8/2001 | Lomp et al. |
| 6,282,184 B1 | * | 8/2001 | Lehman et al. ............. 370/342 |
| 6,307,877 B1 | | 10/2001 | Philips et al. |
| 6,317,422 B1 | | 11/2001 | Khaleghi et al. |
| 6,324,159 B1 | | 11/2001 | Mennekens et al. |
| 6,351,236 B1 | | 2/2002 | Hasler |
| 6,359,940 B1 | | 3/2002 | Ciccarelli et al. |
| 6,370,669 B1 | | 4/2002 | Eroz et al. |
| 6,373,831 B1 | | 4/2002 | Secord et al. |
| 6,400,314 B1 | | 6/2002 | Krasner |
| 6,411,661 B1 | * | 6/2002 | Nguyen et al. ............. 375/336 |
| 6,480,529 B1 | | 11/2002 | Sih et al. |
| 6,542,558 B1 | | 4/2003 | Schulist et al. |
| 6,549,784 B1 | * | 4/2003 | Kostic et al. ............... 455/501 |
| 6,563,856 B1 | | 5/2003 | O'Shea et al. |
| 6,580,921 B1 | | 6/2003 | Inoue et al. |
| 6,597,727 B2 | | 7/2003 | Philips et al. |
| 6,614,834 B1 | | 9/2003 | Meng et al. |
| 6,748,010 B1 | * | 6/2004 | Butler et al. ................ 375/148 |
| 6,898,233 B2 | | 5/2005 | Philips et al. |
| 2001/0003530 A1 | * | 6/2001 | Sriram et al. ............... 375/130 |
| 2002/0064142 A1 | * | 5/2002 | Antonio et al. ............. 370/335 |

FOREIGN PATENT DOCUMENTS

| | | |
|---|---|---|
| EP | 0 563 020 A2 | 9/1993 |
| EP | 0 767 544 | 4/1997 |
| EP | 0 820 159 A2 | 1/1998 |
| EP | 0 928 084 | 7/1999 |
| FR | 2 675 968 | 10/1992 |
| WO | WO 96/38993 | 12/1996 |
| WO | WO 97/14056 | 4/1997 |
| WO | WO 98/02758 | 1/1998 |

OTHER PUBLICATIONS

Corraza et al., *Probability of Error in the Return Link of a CDMA Mobile Satellite System*, IEEE, pp. 1293-1297, 1996.

DaSilva, V. et al., *Performance of orthogonal CDMA codes for quasi-synchronous communication systems*, Aug. 1993, Universal Personal Communications, vol. 2, pp. 995-999.

De Gaudenzi et al., *Bandlimited Quasi-Synchronous CDMA: A Novel Satellite Access Technique for Mobile and Personal Communication Systems*, IEEE Journal on Selected Areas in Communication, vol. 10, No. 2, pp. 328-343, Feb. 1992.

De Gaudenzi, *Signal Recognition and Signature Code Acquisition in CDMA Mobile Packet Communications*, pp. 196-208, IEEE Transactions on Vehicular Technology, vol. 47, No. 1, 1998.

Esmailzadeh, R. et al., *Quasi-synchronous time division duplex CDMA*, 1994, IEEE GLOBCOM '94, vol. 3, pp. 1637-1641.

Ojanpera, *Wideband CDMA for Third Generation Mobile Communications*, Artech House Publishers, 1998, pp. 114-115.

Philips et al., *A Programmable CDMA IF Transceiver ASIC for Wireless Communications*. IEEE 1995 Custom Integrated Ciruits Conference.

Sirius Communications Press Releases, CDMAX: Sirius Announces World's First Software-Configurable W-CDMA Core for Third Generation Wireless Handsets and Base Stations, Jun. 14, 1999, www.sirius.com.

Van Wyk et al., *Performance Tradeoff Among Spreading, Coding and Multiple-Antenna Transmit Diversity for High Capacity Space-Time Coded DS/CDMA*, IEEE, 1999.

* cited by examiner

METHOD AND SYSTEM FOR HIGH-SPEED SOFTWARE RECONFIGURABLE CODE DIVISION MULTIPLE ACCESS COMMUNICATION

RELATED APPLICATION

This application is a continuation application of International Application PCT/BE00/00053 filed on May 10, 2000 and published in English on Nov. 16, 2000, which claims priority to U.S. provisional application No. 60/133,340 filed on May 10, 1999.

BACKGROUND OF THE INVENTION

1. Field of the Invention

The present invention is relates to a communication device for W-CDMA and a method of operating the communications device.

2. Description of the Related Technology

A communication device, for example, for Wideband Code Division Multiple Access (W-CDMA) is configured to operate in accordance with a predetermined telecommunication standard and predetermined parameters. The communication device typically has a digital signal processor (DSP) that allows it to adapt to changes of the physical layer.

There is therefore a need for a W-CDMA system, which allows the implementation of various telecommunication standards, and various applications realizable according to these standards, without the need for a powerful DSP processor for the flexible part of the physical layer. Further, there is a need for a W-CDMA apparatus that provides for various fading channel circumstances.

SUMMARY OF CERTAIN INVENTIVE ASPECTS

One aspect of an inventive embodiment involves a communication device for W-CDMA signal transmission and reception. The communication device has a W-CDMA transmitter having at least one of a first RAM and first registers, wherein the transmitter is configured to operate in accordance with first parameters. Further, the communication device has a W-CDMA receiver having at least one of a second RAM and second registers, wherein the receiver is configured to operate in accordance with second parameters, and a signal acquisition component. A processor is in communication with the W-CDMA transmitter, the W-CDMA receiver and the signal acquisition component, and configured to provide for software configuration of the first and second parameters.

A software reconfigurable component for which parameters of a circuit and/or algorithmic alternatives for this circuit may be configured using software settings. The circuit itself is built up of logic, and contains memory, such as registers, a RAM, or both, which are preferably controlled by a processor subsystem, which performs the above mentioned software settings. Such an approach leads to lesser power consumption if compared to a complete software implementation, while there is still sufficient flexibility possible.

The communication device may further comprise a data processor. Such a processor may be any kind of processor capable of changing the settings of the device. Examples of such processors are DSP processors, microprocessors, microcontrollers, FPGA, logic circuits and FSM circuits.

In one embodiment of the communication device, the processor is configured to reconfigure the communication device. The processor may control the RAM, the resisters, or both, of the W-CDMA signal transmitter and receiver. The transmitter may have a first programmable pulse shaping filter and the receiver may have a second programmable pulse shaping filter which may be programmable to perform GMSK filtering while the transmitter and receiver are configured to interface with a GSM front-end. The processor may be configured to perform the GSM protocol stack.

In one embodiment, the communication device is configured for waveform transmission, reception, acquisition, or a combination thereof, of signals selected from the group consisting of UMTS, Satellite UMTS, Galileo, GPS, IS-2000, IMT-2000, CDMA2000, IS-95, 3GPP, 3GPP2 and ARIB signals.

In one embodiment, the transmitter of the communication device may include at least one of a synchronization hardware to slave transmit start epochs to events external to the transmitter, a burst generator for realizing discontinuous transmissions, a QPN channel containing one or more spreaders with their own amplification of the output, a combiner to accumulate the QPN channel output, a PN code generator, a scrambling code generator, a scrambler, a combiner which accumulates the scrambling code output, a pulse shaping oversampling filter, and an NCO and upconverter for carrier precompensation.

The PN code generator may be realized as a RAM in which the PN codes are downloaded under control of the processor. The scrambling code generator may be realized as a programmable Gold Code generator. The QPN channel may be configured to execute UMTS forward or return link transmission. The amplification of the spreader output may be configured to perform transmit power control.

In one embodiment, the transmitter of the communication device has a time interpolator to perform sub-chip time alignments (for example, for S-CDMA). Further, the transmitter of the communication device may be configured for multi-code transmission.

In one embodiment, the receiver of the communication device may include a pulse shaping filter, an optional level control block, a demodulator assigned to track the multipath components received from one base station, and a reference demodulator for S/(N+I) measurements. Further, the receiver may have a downconverter prior to the pulse-shaping filter in order to interface at a front-end at an intermediate frequency. The receiver may also be configured for execution of at least one of the following signal protocols: UMTS, Satellite UMTS, Galileo, GPS, IS-2000, IMT-2000, CDMA2000, IS-95, 3GPP, 3GPP2, and ARIB forward link and return link waveforms.

In one embodiment, the level control block may have a programmable shifter to perform coarse grain dynamic control, a programmable multiplier to perform fine grain dynamic control, an overflow counter operating on the most significant bit and the second most significant bit, an overflow counter operating on the second most significant bit and the third most significant bit, and a saturation logic to clip the result from the multiplier. The level control block may be operated in a runtime control loop by the processor.

In one embodiment, the demodulator may have a Rake filter producing a signal at a chip rate which is a coherent accumulation of channel corrected multi-path components resulting from one base station, and a tracking unit using the signal at chip rate for descrambling and despreading a plurality of waveform channels.

The Rake filter has a FIFO to buffer samples at a chip rate coming from the level control block, a delay line containing a plurality of registers, wherein the input of the delay line is connected to the output of the FIFO, a plurality of finger blocks having inputs connected to programmable tap positions on the delay line, and a summator of complex outputs of the finger blocks at chip rate. The finger blocks are preferably respectively grouped in a "late" multi-path group and an "early" multi-path group. The Rake filter is configured to accumulate the energies of the outputs of the late multi-path group and the early multi-path group, and to use these accumulated values to feed the time error detector of a DLL used for time tracking.

In one embodiment, the Rake filter may include memories to hold one or more of spreading code for a channel correction pilot, scrambling code for a channel correction pilot, a channel correction pilot symbol modulation, a channel correction pilot symbol activities. The memories may be controlled by the processor.

In one embodiment, the finger block may have a channel correction pilot descrambler, a channel correction pilot despreader, and a channel correction pilot filter, which first performs a coherent channel correction pilot symbol accumulation over a programmable number of steps, and which secondly produces a weighted average on a programmable number of the coherent channel correction pilot symbol accumulation over a programmable number of steps. Further, the finger block has a channel estimator generating a channel estimation at a chip rate using the outputs of the pilot filter, a channel corrector performing a multiplication of the incoming chip stream with the complex conjugate of the channel estimation, a calculation of the slot energy, a comparison of the slot energy with a programmable threshold, a circuit to force the channel estimation to zero if the threshold is not exceeded.

The finger may be configured for slow and fast fading compensation, for example, by programming the channel correction pilot filter for slow fading. The channel correction pilot filter first performs a coherent accumulation over a slot, and secondly performs a weighted average over previous-previous, previous, actual and next obtained slot values. This yields a channel estimation per slot, which is applied by the channel corrector. For fast fading, the channel correction pilot filter first performs a coherent accumulation over a slot, and then derives channel estimations through interpolating consecutively the coherent accumulations over a slot. This yields in channel estimations with sub-symbol timing which are applied by the channel corrector.

In one embodiment, the reference demodulator may have an accumulator of programmable length of the absolute values of samples at a chip rate, and a low pass filter operating on the accumulator output. The reference demodulator may be configured to operate in a runtime control loop by the processor. Further, the demodulator may be configured to perform satellite diversity.

In one embodiment, the communication device may be configured to perform accurate ranging measurements to geostationary satellites. The communication device may be implemented in an integrated circuit. Further, the communication device may be implemented within an intellectual property core (as a building block for inclusion in an integrated circuit).

Another aspect of a one embodiment involves a method of operating a W-CDMA communication device. The method configures the communication device for a predetermined use, and transmits, receives, acquires, or a combination thereof, waveform signals. The waveform signals may be selected from the following: UMTS, Satellite UMTS, Galileo, GPS, IS-2000, IMT-2000, CDMA2000, IS-95, 3GPP, 3GPP2 and ARIB signals. The configuring may be performed by a processor.

BRIEF DESCRIPTION OF THE DRAWINGS

These and other aspects, advantages, and novel features of the invention will become apparent upon reading the following detailed description and upon reference to the accompanying drawings. In the drawings, the same elements have the same reference numerals.

DETAILED DESCRIPTION OF CERTAIN INVENTIVE EMBODIMENTS

In the following detailed description, the following abbreviations are used:

| | |
|---|---|
| BS | Base station |
| CCPCH | Common Control Physical Channel |
| DL | Downlink |
| DPCH | Dedicated Physical Channel |
| DPCCH | Dedicated Physical Control Channel |
| DPDCH | Dedicated Physical Data Channel |
| GSM | Global System for Mobile communication |
| HO | HandOver |
| MRC | Maximum Ratio Combining |
| MS | Mobile station |
| OVSF | Orthogonal Variable Spreading Factor |
| PN | Pseudo-Noise |
| PRACH | Physical Random Access Channel |
| QPN | Quadrature Pseudo-Noise |
| RSSI | Received Signal Strength Indication |

-continued

| SF | Spreading factor |
| --- | --- |
| UL | Uplink |
| W-CDMA | Wide Band CDMA |

Transmitter Specification

Figure 1:
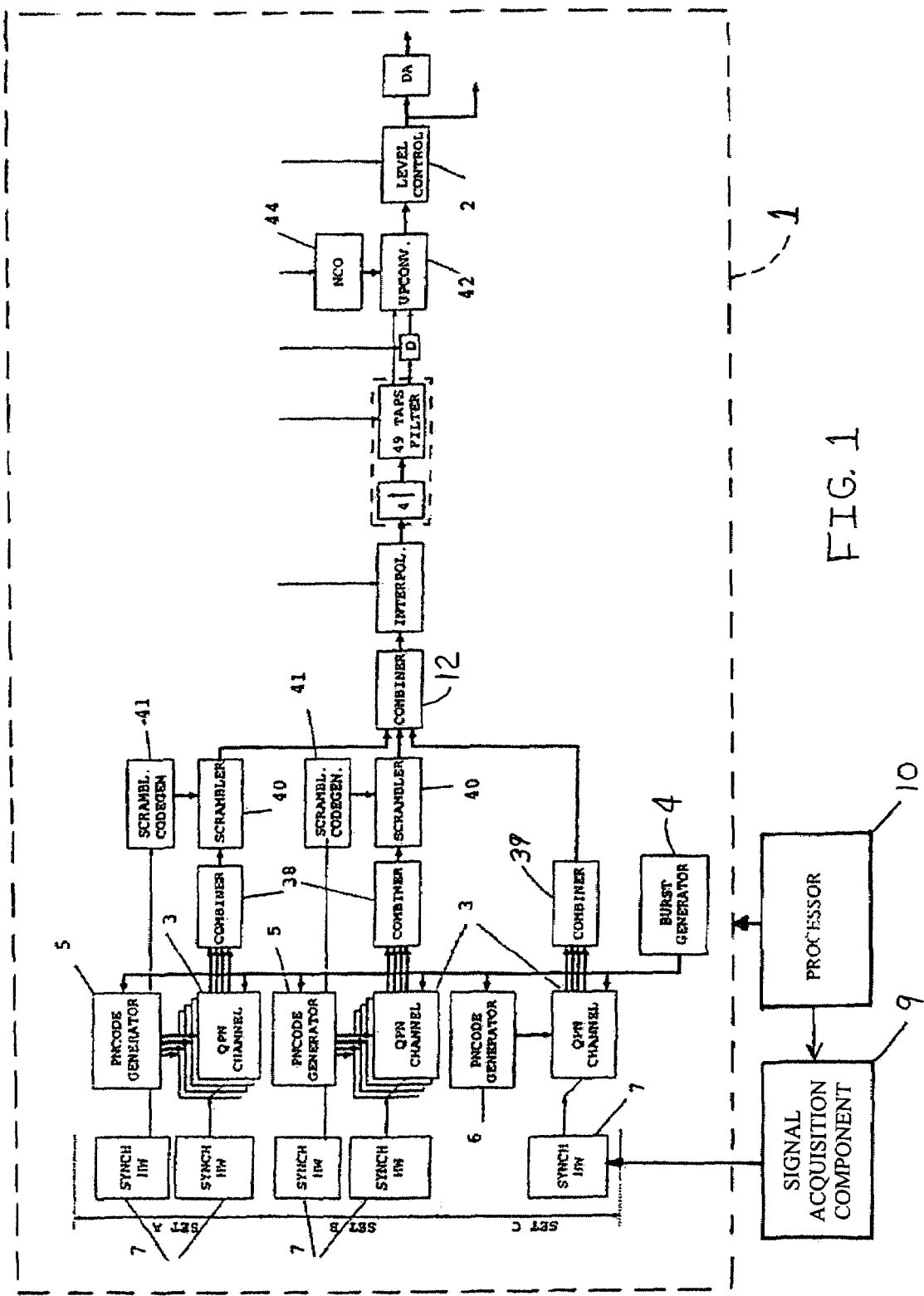
FIG. 1 represents a global transmitter structure of one embodiment of a communication device.

The global structure of an exemplary transmitter 1 is shown in FIG. 1 and explained in detail hereinafter.

QPN Channels with Synchronization Hardware and PN-code Generators

Figure 2:
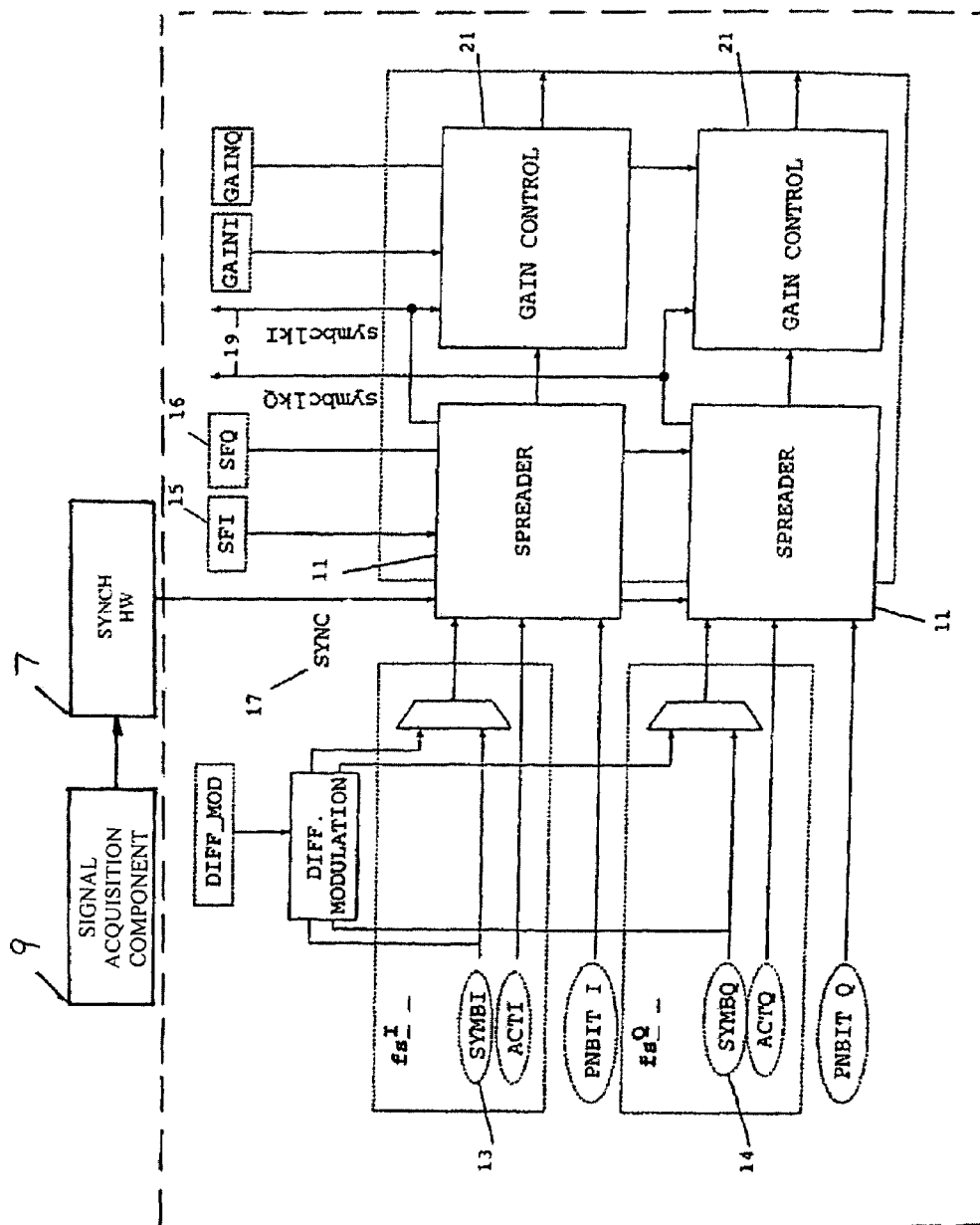
FIG. 2 represents a QPN channel.

The transmitter 1 contains a plurality of QPN channels 3 as shown in FIG. 2. These channels are, for example, combined in two sets of four QPN channels (set A and set B) and a set C with only one QPN channel, as shown in FIG. 1. Each set has a separate block for generating a PN-code 5 and a separate synchronization hardware 7, which defines a start of symbol transmission. A processor 10 is in data communication with the transmitter 1 and provides operational parameters for the transmitter. The transmitter 1 and processor 10 are also shown as part of a communication device/intergrated circuit 20 shown in FIG. 22.

Synchronization Hardware

An output of the synchronization hardware 7 goes to the QPN channels of a set and defines a common symbol start moment for all QPN channels in a set. This signal is generated as a selection of one out of a plurality of incoming signals with a programmable offset. The incoming sync channels may, for example, be generated by: another chip, TX timers, receiver pulse, signal acquisition component 9 output, or the like. In certain embodiments, the signal acquisition component 9 connects to each synchronization hardware 7. The processor 10 is in data communication with the signal acquisition component 9. The signal acquisition component 9 and the synchronization hardware are also shown as part of the communication device 20 shown in FIG. 22. In one embodiment, a counter at the chip rate may be used to generate the offset. This gives an offset resolution of one 'primary' chip. The range of the offset is [0:65535]. This is sufficient to give an offset of one frame for UMTS (40960 chips).

QPN Channel 3

Each QPN channel 3 has the functional structure represented in FIG. 2. Its functional elements are described below:

Spreader 11

Figure 22:
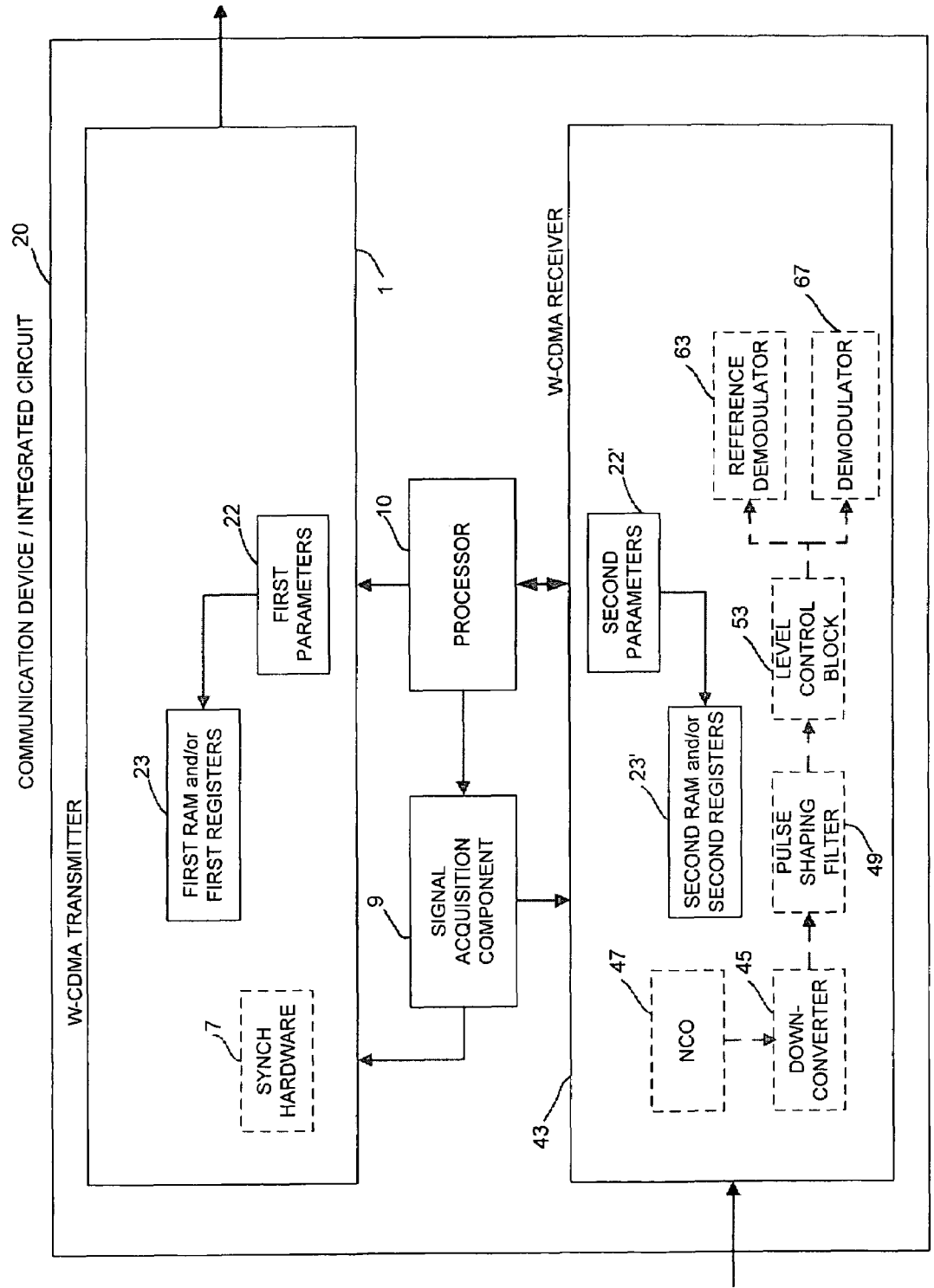
FIG. 22 represents an exemplary structure of one embodiment of the communication device.

Input binary symbols coming directly from an interface (symbI 13 and symbQ 14) are spread with PNbits PNbitI and PNbitQ. Each symbol has an activity bit (actI and actQ). When this is 0 the functional spreader output will be 0 instead of +1 or −1. This activity bit is used for burst transmission and for BPSK instead of QPSK/QPN transmission. Signals symbI and actI are signals at a symbol rate fsIxx. Signals symbQ and actQ are signals at a symbol rate fsQxx. The symbol rate fsIxx may differ from the symbol rate fsQxx. The spreading factor is set by a sfI input 15 and a sfQ input 16. The sfI input 15 and the sfQ input 16 are two of the first parameters 22 (FIG. 22) that are used to configure the spreader 11, which is a part of the transmitter 1 (FIGS. 1 and 22). Other first parameters 22 that are used to configure the spreader 11 are indicated by the dashed boxes as shown in FIG. 2. The first parameters 22 for the transmitter 1 are received from the processor 10 and are stored in memory 23 comprising a first RAM and/or first registers. The spreaders may be (re)started via a sync signal 17 obtained from the acquisition unit 9 via the synchronization hardware 7. A rate fcp is defined as: fcp=fsIxx*sfI=fsQxx*sfQ.

Symbol clock signals 19 (symbclkI and symbclkQ) are generated as a symbol reference for other hardware that requires symbol synchronous actions, like the gain controls 21.

Gain Control (Transmit Power Control)

Each complex spreader 11 is followed by a separate gain control 21. Each output branch of a spreader is again separately gain controlled.

PN-code Generators

The PN-code generators generate complex PN codes for the QPN channels 3 (FIG. 1). A code generator 5 is provided for a set. For example: the PN-code generators 5 for sets A and B generate each four complex codes, while the PN-code generator 6 for set C generates only one complex PN-code. A burst generator 4 is connected to the PN-code generators 5, the PN-code generator 6, and the OPN channels 3. The burst generator 4 provides enabling signals for the code generation. As a function of time, the burst generator 4 specifies for each code when it is "on" (=enabled) and when it is "off" (=not active).

Gold Code Generator

This is a classical Gold code generator with, for example, 42 bit registers which may generate any Gold code with any length up to $(2^{42})-1$. It may also be used to generate any segment out of a Gold code smaller than $(2^{42})-1$.

The sgfb inputs define the feedback position in the shift register and the init inputs are used to initialize the shift registers at reset or restart. The poly inputs are used to program the polynomials to generate the Gold sequences. The rest signals are used to generate a small section of the complete Gold code and then jump to the back to the init value. If the register in the gold code generator reaches the rest state, the register is in the following clock-cycle re-initialized.

RAM Based Code Generation

Figure 3:
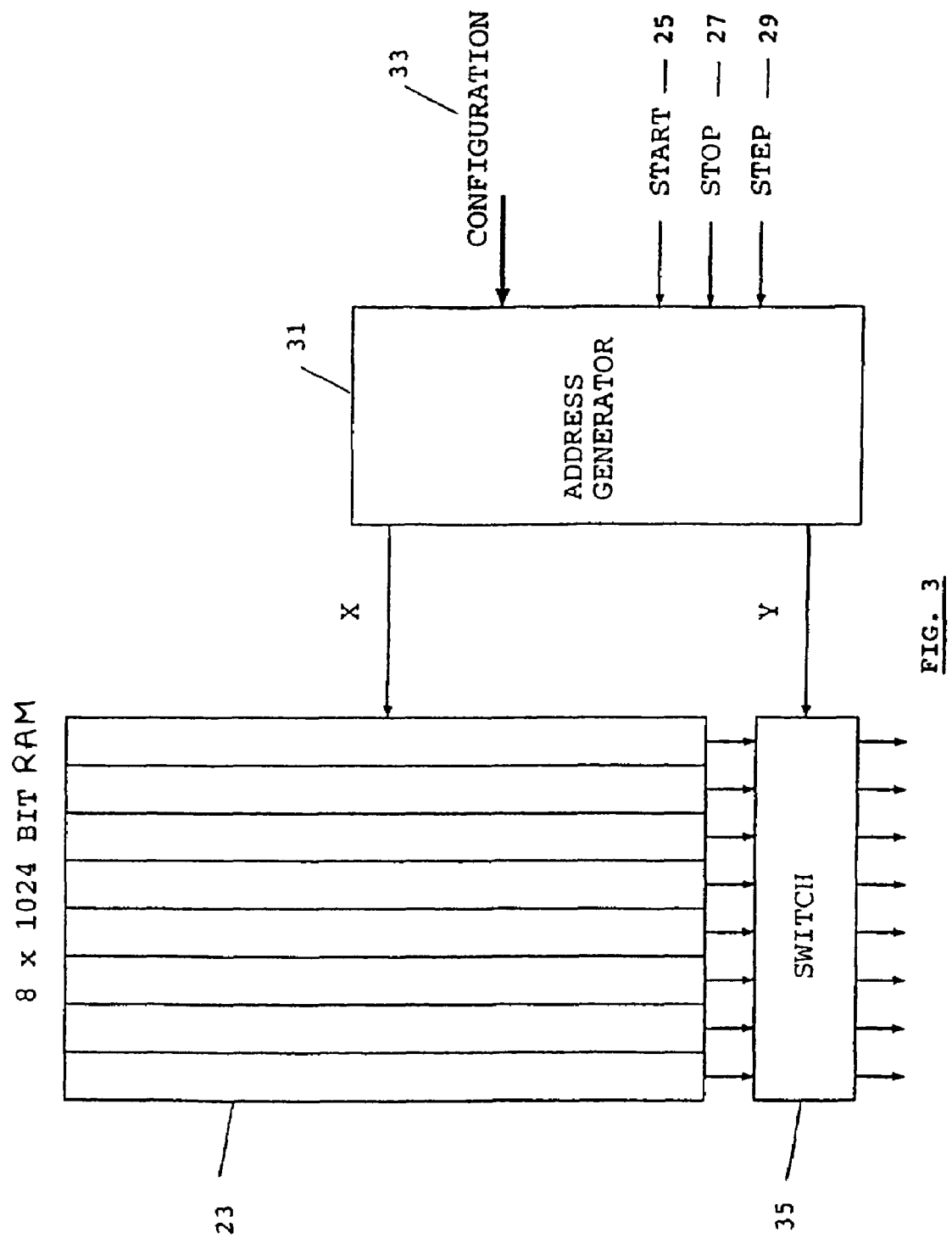
FIG. 3 represents the use of a RAM block to generate PN-codes.

Each set has a block 23 that may generate PN-codes based on a RAM. For all three sets the same block 23 is used. This is shown in FIG. 3. The block 23 contains a RAM of, for example, 8*1024 bits. An address generator 31 selects one row 35 of this RAM with the x address. These 8 bit are then routed to the spreaders via a switch controlled by an address y. The address generator 31 has a start 25, stop 27 and step input 29. The address generator 31 may be configured in different ways with the configure input 33. It is possible to stop the generators when the activity bit of a symbol is 0.

Figure 4:
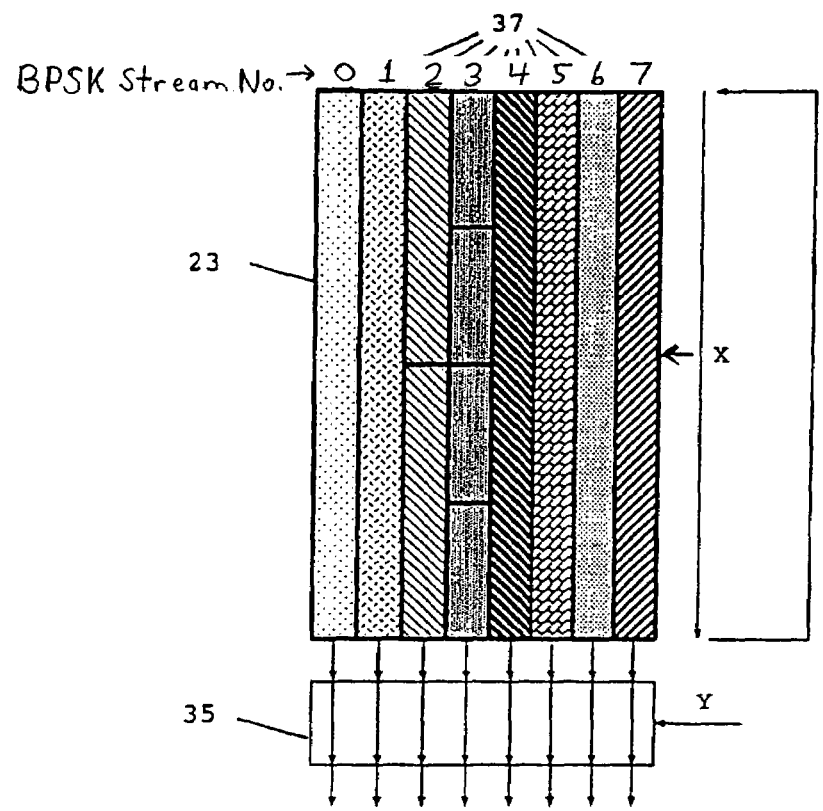
FIGS. 4 to 7 represent possible RAM configurations for the communication device.

The following are examples of possible RAM configurations:

FIG. 4: 8 BPSK streams 37, streams 0, 1, 4, 5, 6 and 7 have SF 1024, stream 2 has SF 512 and stream 3 has SF 256; x counts from 1023 to 0, y is a static value.

Figure 5:
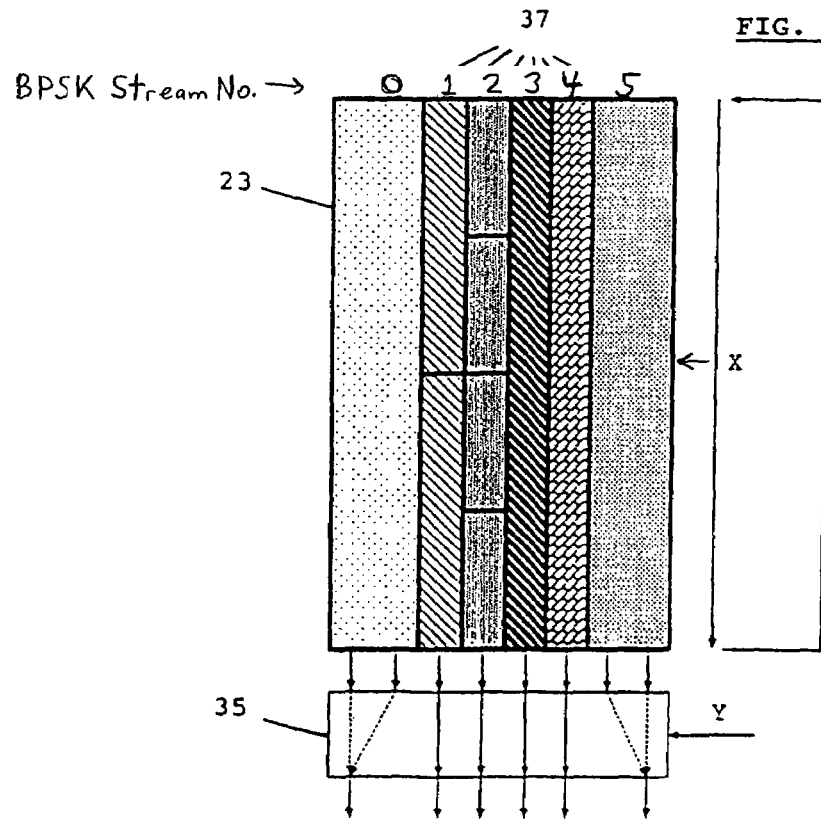

FIG. 5: 6 BPSK streams 37, stream 0 and 5 have SF 2048, stream 1 has SF 512, stream 2 has SF 256, streams 3 and 4 have SF 1024; x counts from 1023 to 0, y changes between two values every 1024 chips.

Figure 6:
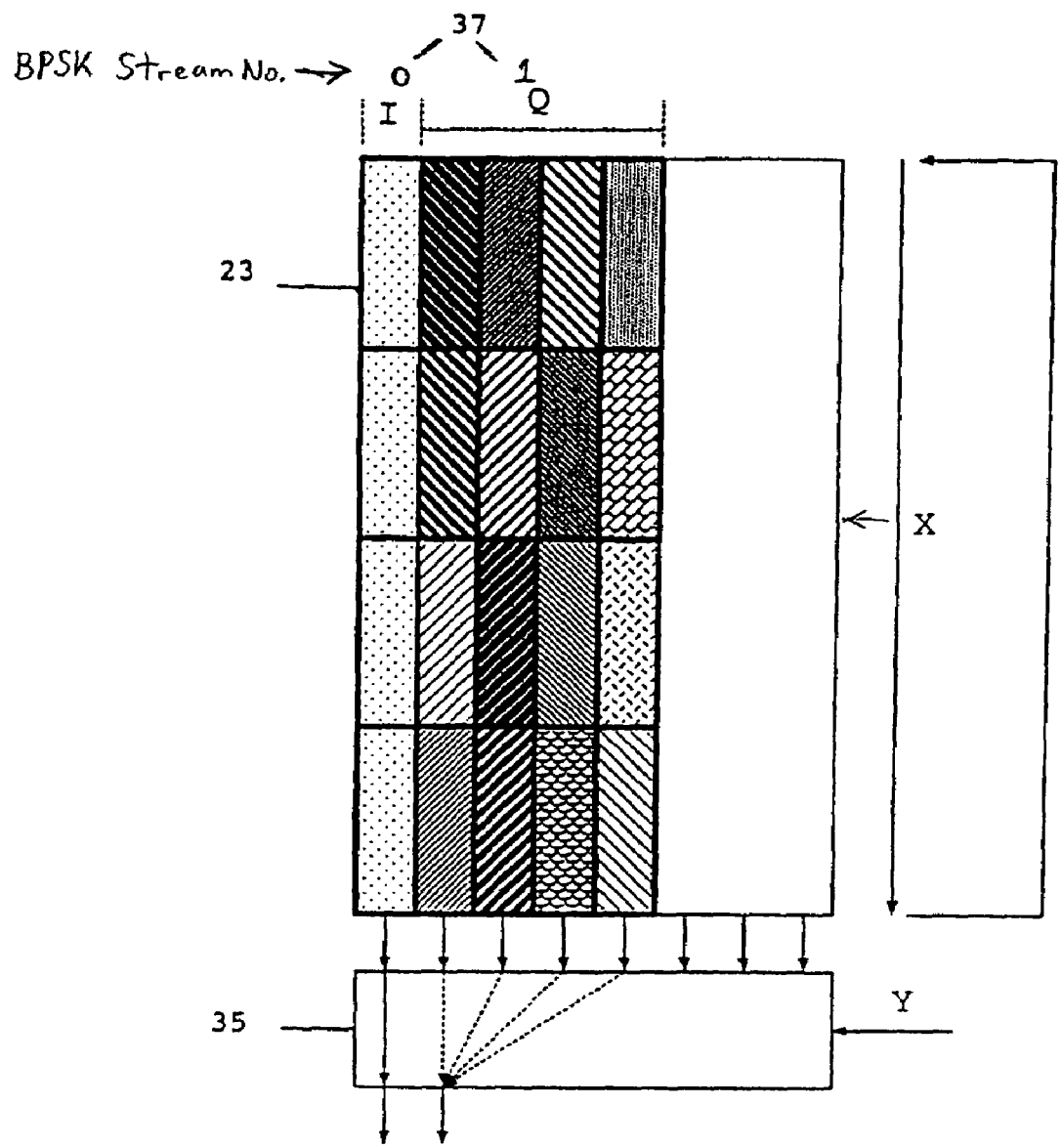

FIG. 6: 2 BPSK streams 37, stream 0 and 1 have SF 256, stream 0 uses continuously the same code while stream 1 uses a sequence of 16 different codes. This scheme is usable for SCH transmission if the address counter is stopped when the activity bit is 0. x counts from 1023 to 0, y changes between 4 values every 1024 chips.

Figure 7:
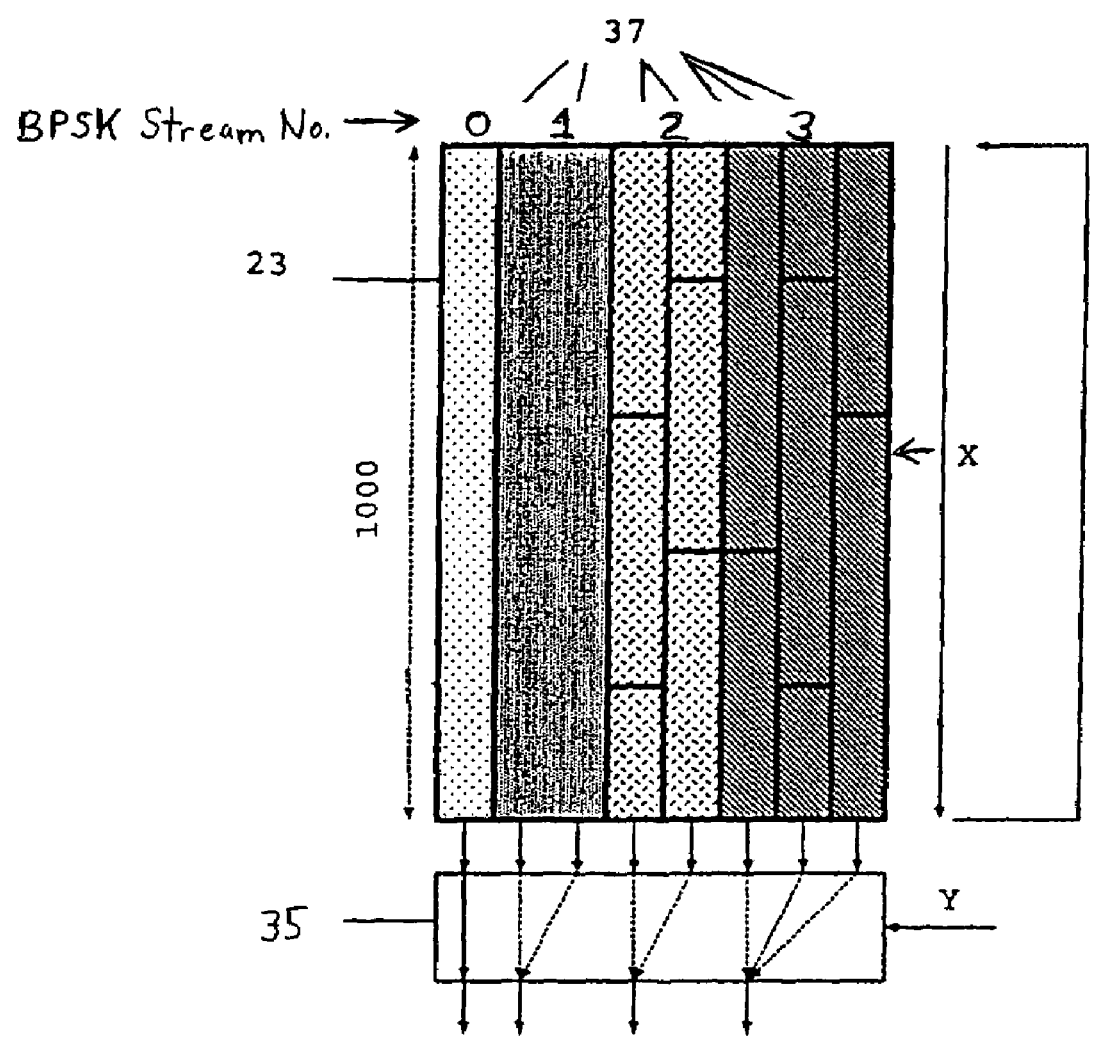

FIG. 7: 4 BPSK streams 37, stream 0 has SF 1000, stream 1 has SF 2000, stream 2 has SF 400, stream 3 has SF 600; x counts from 999 to 0, y changes between 3 values every 1024 chips.

As shown in these examples, in the case of variable spreading factor transmission (for example, OVSF codes in UMTS), it is assumed that spreading factors have a common multiple. The RAM is filled with replicas until the common multiple length is reached. In this way the symbols in one set are multiple-symbol synchronous.

Combiners at fcp Rate

The two combiners 38 after set A and set B at fcp rate output the sum of the 4 incoming complex numbers.

Scrambler 40 and Scrambling Code Generation

Scrambling Code Generator 41

The scrambling code generator 41 block generates the complex scrambling code Cscramb=cI+jcQ. Each scrambling code generator has its own synchronization hardware block to generate the sync signal. (see FIG. 1). The scrambling code generator 41 contains two Gold code generators with 42 bit register, two RAMs of 256 bit, an interface for external input of codes and extra hardware for UMTS to modify the Gold codes. The Gold code generators are functionally the same as the Gold code generators in the PN code generators. A classical Gold code generator with 42 bit registers may generate any Gold code with any length up to $(2^{42})-1$. It may also be used to generate any segment out or a Gold code smaller than $(2^{42})-1$.

The sgfb inputs define the feedback position in the shift register, the init inputs are used to initialize the shift registers at reset or restart. The poly inputs are used to program the polynomials to generate the Gold sequences. The rest signals are used to make generate a small section of the complete Gold code and then jump to the back to the init value. If the register in the Gold code generator reaches the rest state, the register is in the following clock-cycle re-initialized. It is possible to re-initialize the generators after a programmable number of chips or to let them run freely.

Examples of Different Modes

Mode 0 cI and cQ are any Gold code with any length of maximum $(2^{42})-1$.

Mode 1 cI and cQ come directly from a RAM of 256 bit. It must be possible to use only the first k bits in the RAM, with k smaller than 257.

Mode 2

Mode 0 but with zero extension in front of the generated Gold codes. cI=<0, c1>, cQ=<0, c2>

Mode 3 (UMTS specific)

Mode 0 or Mode 1 but c1 and c2 coming from the Gold code generators or RAM are modified in the following way:

$$Cscramb=cI+jcQ=c(w+jc'w)$$

where w0 and w1 are chip rate sequences defined as repetitions of:

$$w=\{1\ 1\},$$

$$w=\{1\ -1\},$$

and where c is a real chip rate code, and c' is a decimated version of the real chip rate code. The preferred decimation factor is 2, however other decimation factors should be possible in future evolutions of UMTS if proven desirable.

With a decimation factor of decim=2, c' is given as:

$$c'(2k)=c'(2k+1)=c(2k),\ k=0,1,2,\ldots$$

c1 and c2 are constructed as the position wise modulo 2 sum of 40960 chip segment of two binary m-sequences generated by means of two generator polynomials of degree 41.

The code c2, used in generating the quadrature component of the complex spreading code is a 1024-chip shifted version of the code c1 used in generating the in-phase component.

Scrambler 40

The scrambling is in fact an overlay spreading without changing the chip rate. The change in chip rate is done with the Hold 1-256 block.

Input data: dI+jdQ

Input scrambling code: c1+jcQ

This scrambler 40 has 3 modes:

Off: output=input

Complex scrambling: output=(dI+jdQ)*(cI+jcQ)=dI*cI−dQ*cQ+j(dI*cQ+dQ*cI)

Dual real scrambling: output=dI*cI+jdQ*cQ

Combiner 12

A combiner 12 combines the outputs of the scramblers 40 and an output of a combiner 39 for set C by accumulating the signals.

Interpolator with Chip Phase Control

The interpolator is used to do a chip phase shift with a resolution smaller than one chip. For every sample input, one output sample is generated, wherein the input and output clock is the equidistant clock. A linear interpolation is used to perform a function:

$$out(k)=(1-TXMU)*in(k-1)+TXMU*in(k)$$

where in(k−1) and in(k) are two consecutive equidistant complex samples at rate; and where TXMU is an input of the interpolator and is a number (0<=TX_MU<=1).

Upsampling and Programmable Filter

The fixed upsampling with a factor of, for example, four (zero insertion) and a symmetrical programmable filter are realized as a complex oversampling polyphase filter. The output sampling rate f4c is: f4c=4*fc.

Offset Modulation

By setting offset to 1, the Q branch will be delayed with 0.5 chip.

Complex Upconverter 42 and NCO 44

NCO 44

The NCO 44 generates a cosine and sine value. The cos and sin values are frequency and phase controllable. The specifications below are not required for cellular, but may be used for satellite applications with demanding phase noise requirements. The sine and cosine values are generated with the 16 MSB of a s<32, 0> phase value. The 14 LSB of this 16 bit number go to two lookup tables which contain the values for sin and cos in [C, 2*pi[, with a gain of 2047/2048. The lookup word length for sin and cos in quadrant 1 is u<11, 11>. The 2 MSB of the s<32, 0> bit phase register are used to recover the quadrant, wherein sin and cos are s<12, 11> numbers. The output of the NCO 44 is the complex signal (cos+j .sin).

The s<32, 0> bit phase register may be directly controlled via the TXPHASE input (s<32, 0>) or by integrating with wrap around the TXINC (s<32, 0>) value. The TXINC may be used to program the frequency of the generated sine and cosine in the following way:

$$f\sin{=}f\cos{=}TX\_INC/2^{32}*f4c.$$

With TXINC negative a negative (complex) IF will be generated. For example, to generate a complex carrier at −20 MHz, TXINC should be set to −1073741824. The s<32, 0> phase register should be a part of the chip boot chain.

Upconverter 42

Here a complex upconversion with the NCO 44 generated complex carrier is done. The computations are done full precision, wherein the ten multiplications have one redundant bit as the most negative number will never be present in the sin or cos value. Thus the result of the multiplications are s<32, 24> bit numbers. This makes the full precision outputs bit numbers. These full precision numbers are reduced to s<35, 16> numbers.

Level Control 2

The purpose of the level control 2 is to condition the signal coming from the upconverter prior to the DA conversion.

Receiver Specification

Figure 8:
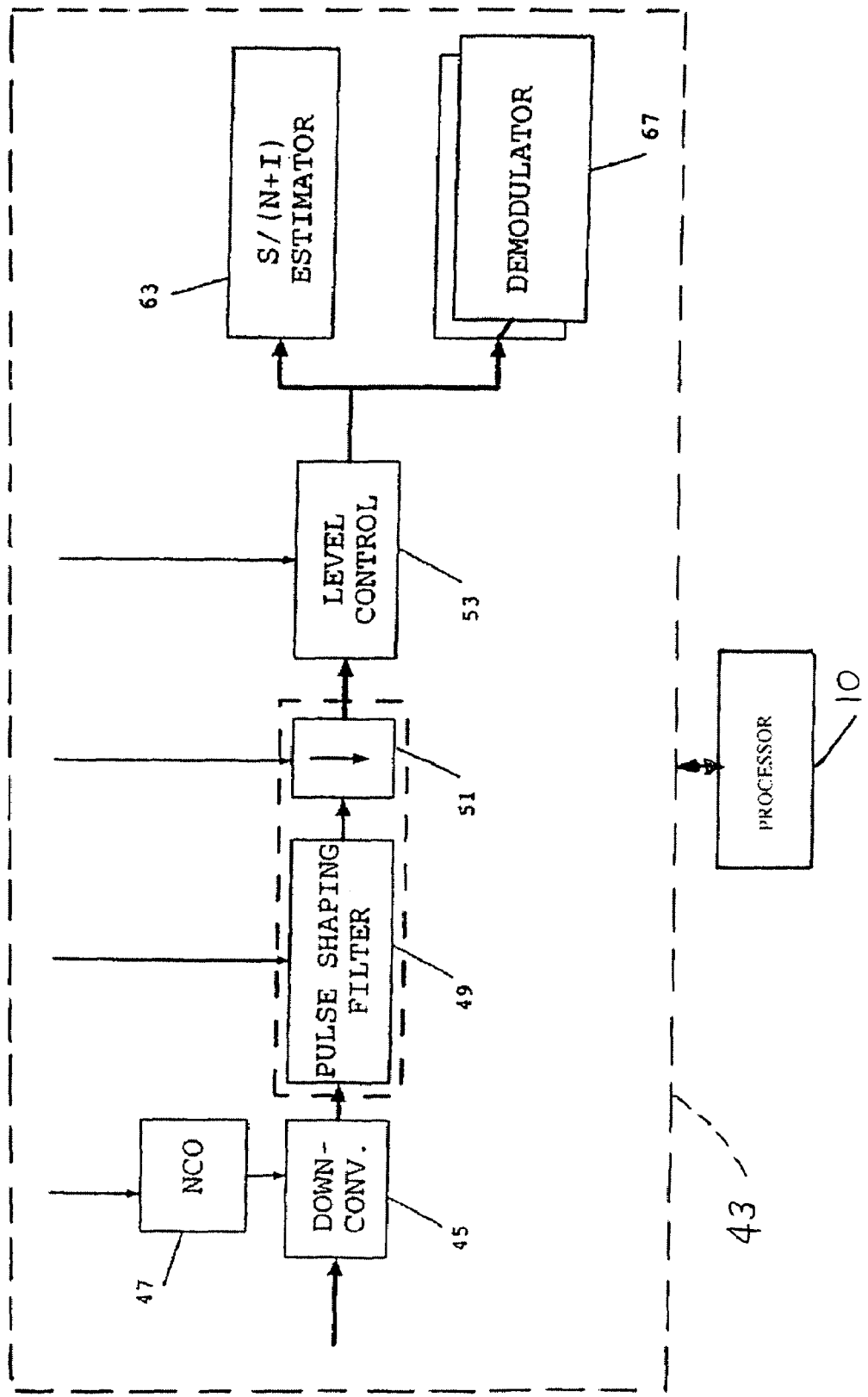
FIG. 8 represents one embodiment of a receiver architecture for the communication device.

The global receiver structure 43 is shown in FIG. 8. The processor 10 is in data communication with the receiver 43 and provides operational parameters for the receiver. The receiver 43 and processor 10 are also shown as part of the communication device 20 shown in FIG. 22. All functional blocks are discussed in more detail in the next paragraphs.

Common Downconverter with NCO 47

Downconverter 45

The downconverter 45 performs a complex downconversion, with the NCO generated complex carrier, on the incoming complex signal. The output signal is expected to be a near baseband signal.

| DO_MODE | data in | carrier in | output |
|---|---|---|---|
| 00 | X + jY | cos + jsin | (X + jY) * (cos + jsin) |
| 01 | X + jY | cos + jsin | (X + jY) * (cos − jsin) |
| 10 | X + jY | cos + jsin | X* (cos + jsin) |
| 11 | X + jY | cos + jsin | X* (cos − jsin) |

Input and output are at fin rate.

Programmable FIR Filter 49 with Downsampling 51

The complex receive stream coming from the downconverter is filtered by a programmable symmetrical FIR filter and downsampled with a factor RXD. RXD may be 1 or 2. Inputs are at fin rate, outputs at f2ct rate.

Level Control 53 with Overflow Detectors

Figure 9:
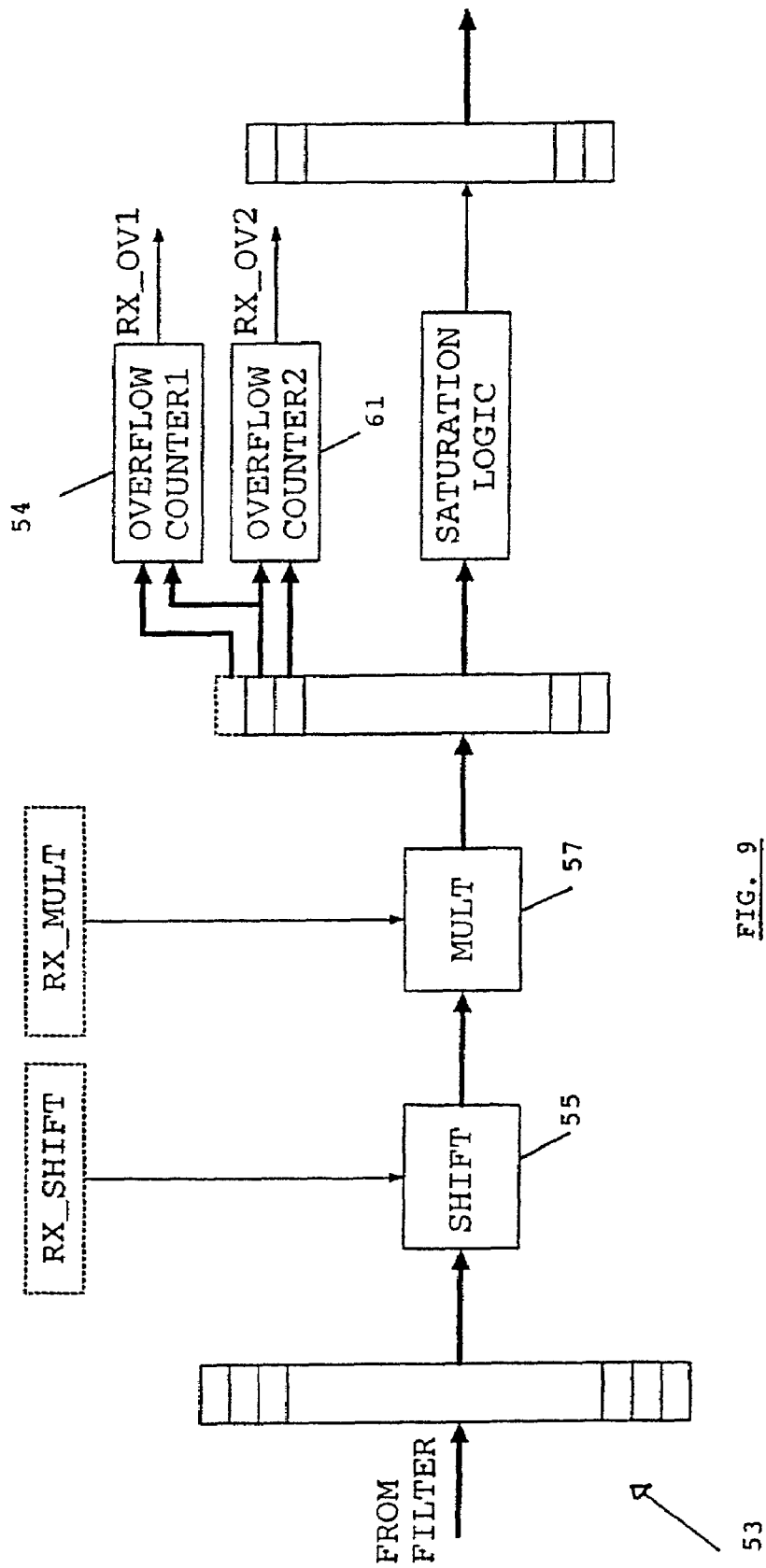
FIGS. 9 represents one embodiment of a level control for the communication device.

To optimize the number of significant bits going into the demodulator correlators a common level control is provided to adapt the level of the signal coming from the filter (see FIG. 9 for the structure).

The incoming complex data is shifted over RXSHIFT bits 55. This is a coarse gain with 6 dB steps. A lower resolution gain control is done by the multiplication by RXMULT 57. The multiplication is followed by a saturation logic (on the data) and overflow counters. For this reason, the result from the multiplication is extended with 1 MSB to produce the input for overflow counter 1. Overflow counter 1 59 counts the real overflows, so the overflows where the saturation logic saturates the signal. Overflow counter 2 61 is required to count the overflows as if the signal amplitude was twice as big.

S/(N+I) Estimator 63

Figure 10:
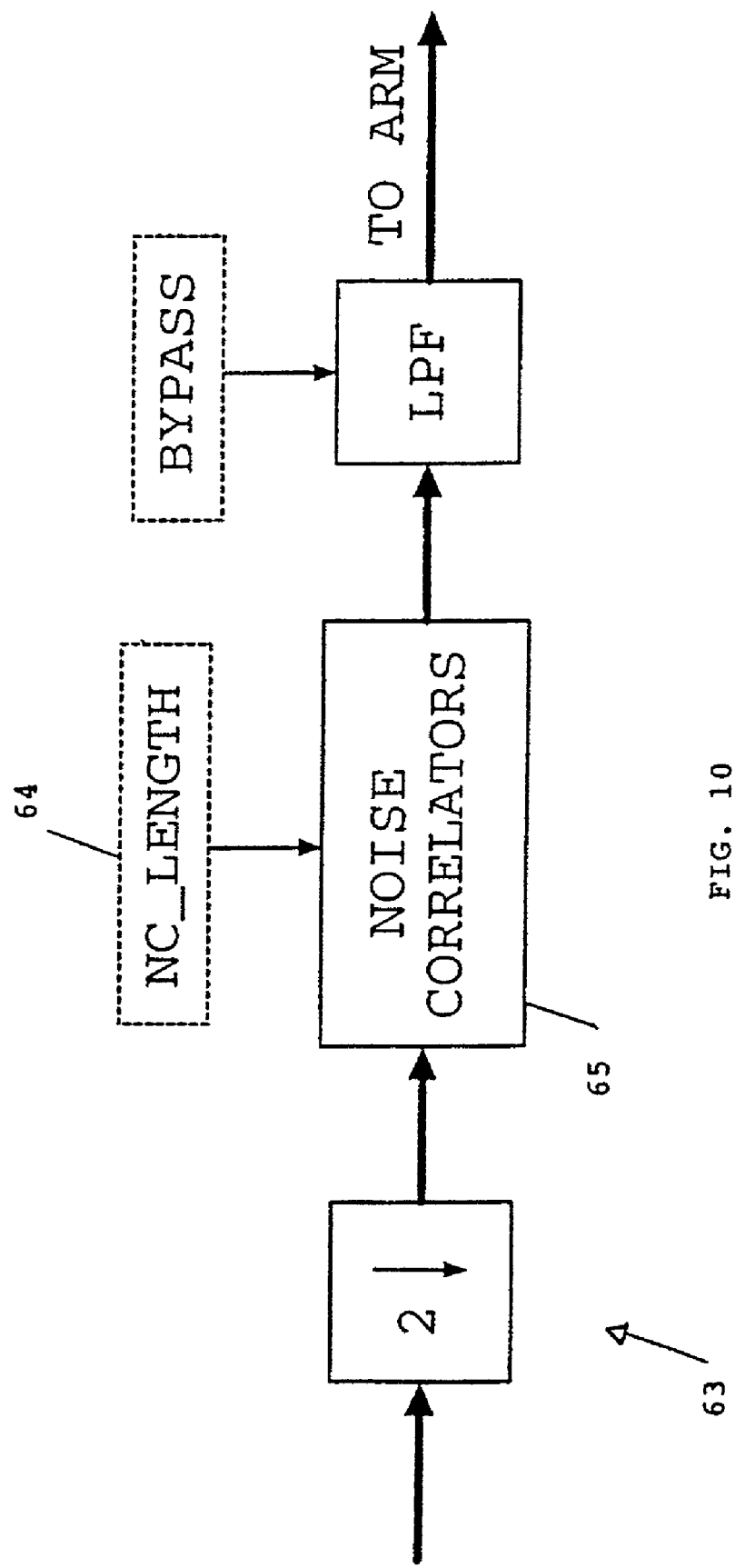
FIG. 10 represents one embodiment of a noise estimator for the communication device.

The noise estimator 63 (FIG. 10), which is also known as a reference demodulator, provides a filtered complex noise correlation value which may be read by the microcontroller subsystem such as processor 10. This value could be used for setting thresholds in the acquisition hardware. The noise correlator 65 is just the accumulation of NC_length absolute values 64 of the complex input. In this way, an RSSI estimation is obtained. The filter is a hardware low-pass filter. By setting the bypass to 1, the low-pass filter may be bypassed. The NC length 64 and bypass are two of the second parameters 22' (FIG. 22) that are used to configure the noise estimator/reference demodulator 63, which is a part of the receiver 43 (FIGS. 8 and 22). Other second parameters 22' that are used to configure the level control 53 in the receiver 43 are indicated by the dashed boxes as shown in FIG. 9. The second parameters 22' for the receiver 43 are received from the processor 10 and are stored in memory 23' comprising a second RAM and/or second registers.

Demodulator 67

In most modes the plurality of demodulators are used to support base station diversity for soft handover, however they may also be used for other purposes. In the following paragraphs the demodulator structure is explained in more detail.

Figure 11:
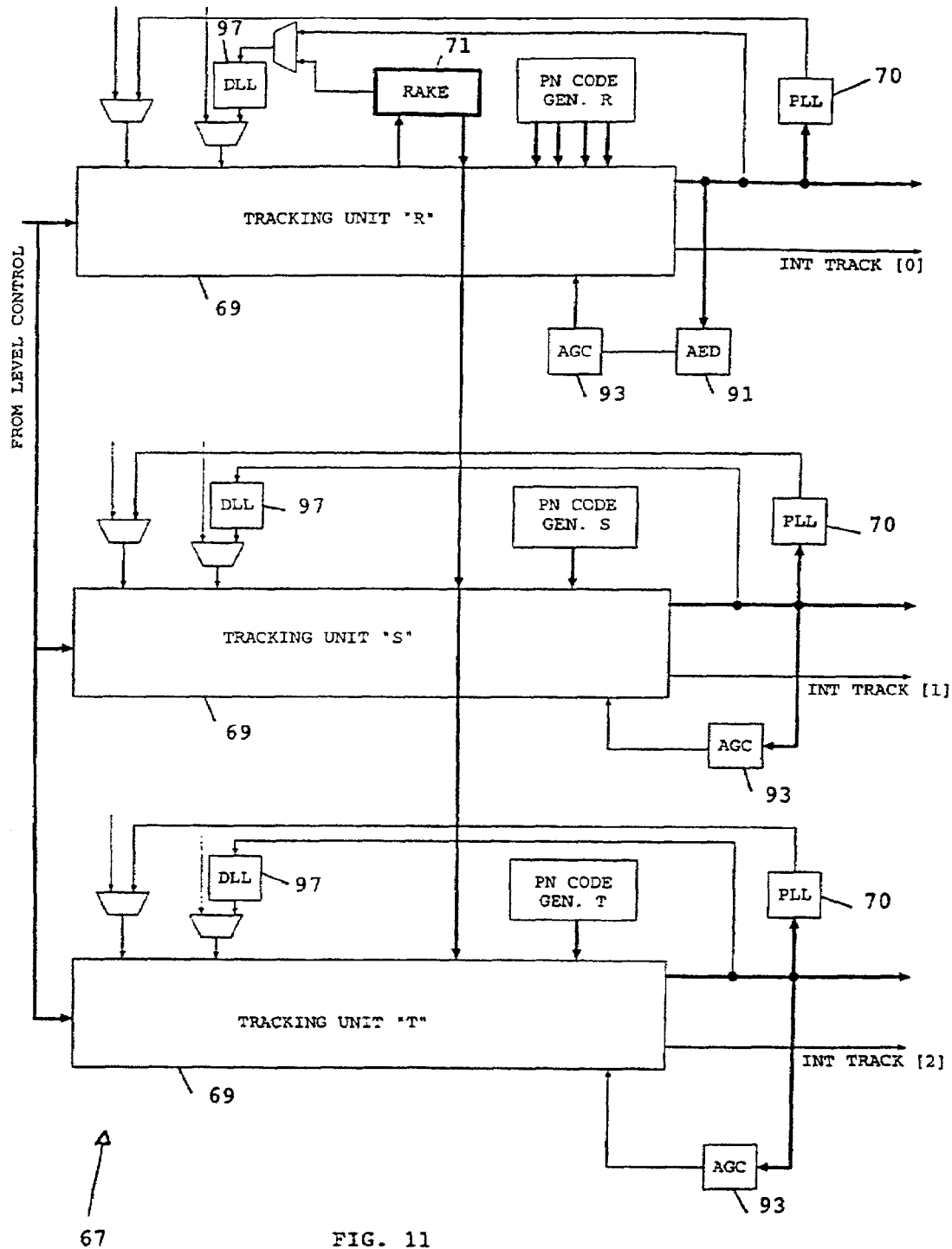
FIG. 11 represents one embodiment of a general overview of a demodulator for the communication device.

FIG. 11 is a general overview of a demodulator 67. The demodulator 67 has a number of tracking units 69 with peripheral hardware such as code generators and feedback signal generators such as PED with PLL 70, TED with DLL 97, AED 91 with AGC 93, as discussed below. Each demodulator 67 has a Rake block 71 performing a combination of channel corrected multi-path components. This block is discussed below in more detail.

It is contemplated that not all the hardware in FIG. 11 is used at the same time. This depends on the configuration. It is possible to turn off idle blocks to save power.

Tracking Unit 69

Figure 12:
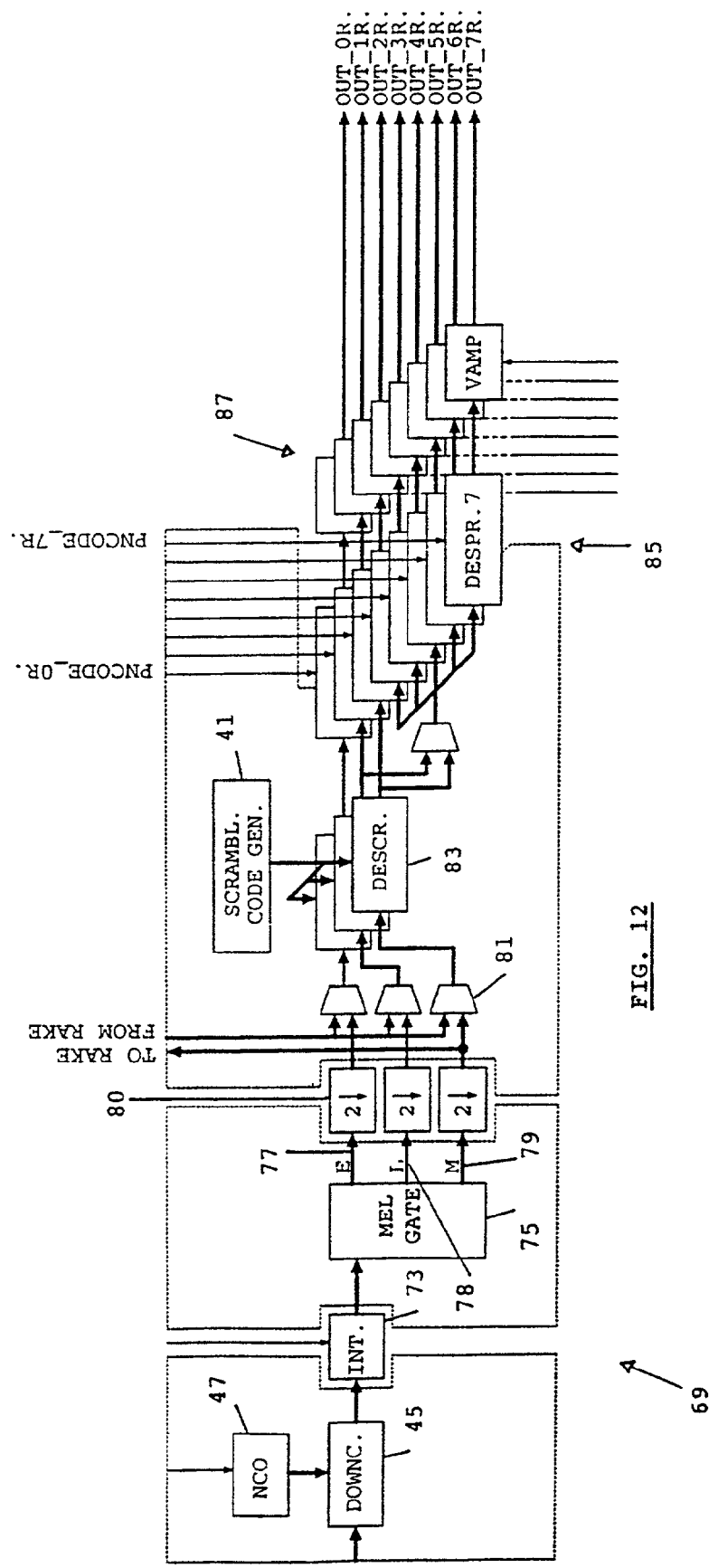
FIG. 12 represents one embodiment of a tracking unit for the communication device.

Each of the, for example, three tracking units 69 (FIG. 12) has the same input: the complex signal coming from the common level control. It is possible to track one signal source with one tracking unit. A signal source may be a physical transmitter or it may be a multi-path component coming from one transmitter. So in one demodulator we may, for example, track three satellites or track three multi-path components (as an alternative to the use of the above mentioned Rake) from a terrestrial base-station. The functional blocks within a tracking unit are described below.

Tracking Unit Down Converter 45 and NCO 47

This block is used as an actuator for the carrier phase/frequency tracking. A final downconversion is performed.

Tracking Unit Interpolator 74 with Chip Frequency Control

The tracking unit interpolator 74 is used as actuator for the chip phase/frequency tracking. This is done by a pseudo-chip rate chance. The outputted chip rate is controlled via the DINT input. Linear interpolation between samples spaced approximately 0.5 chip is performed by:

$$out(k)=(1-INTMU)*in(k-1)+INTMU*in(k),$$

where in(k–1) and in(k) are two consecutive equidistant samples at f2c rate.

The DINT input is used to change the INTMU continuously by adding DINT to the previous value of INTMU every cycle. This results in a change in chip rate by 1/(1+ DINT).

INTMU in [0:1[: one input sample produces one output sample, when INTMU 0: two output samples are produced for one input sample, and INTMU is wrapped back into [0:1[, when INTMU>=1: no output sample is produced for one input sample, and INTMU is wrapped back into [0:1[.

The tracking unit interpolator 74 causes a delay of one sample. For example, when DINT=cte=0, out=in $z^{-1}$ with a 0.0 added at the start.

The input samples are equidistant at f2c rate. The output samples of the interpolator 74 are not equidistant at f2cr rate, which is between f2c/2 and 2*f2c. So all the hardware after the interpolator 74 must be designed to work at 2*f2c although the nominal rate is f2c.

MEL Gate 75

The MEL gate 75 is used in no-cellular modes; otherwise the MEL gate 75 is bypassed through the appropriate multiplexer settings. The incoming stream at f2cr is split in three streams at f2cr rate.

$E = in.z^{-2}$ $M = in. z^{-1}$ $L = in$

In this way each stream is spaced 0.5 chip. The M signal of Tracking unit 0 is also used as input for the Rake block, if it is activated.

Downsampling 80 Factor

A phase controllable downsampling with a factor, for example, 2 is performed by skipping one incoming sample of two incoming samples. D2 defines which phase to skip. The output rate is fc=f2cr/2.

Chip Stream Selection

The three multiplexers 81 allow to chose between which signal goes to the final correlators 83. This can be the downsampled signal coming from the MEL gate 75 or it can be the Rake output at the chip rate.

Scrambling Code Generator 41

This is functionally the same as the transmitter scrambling code generator, but at a fc rate.

Descrambler 83

Input data: dI+jdQ

Input scrambling code: cI+jcQ

This block should have three modes:

Off: output=input,

Complex descrambling: output=(dI+jdQ)/(cI+jcQ)= (dI.cI+dQ.cQ+j(–dI.cQ+dQ.cI))/2.0, Dual real scrambling: output=dI*cI+jdQ*cQ.

In the three modes, the delay between input and output should be the same. Input and output are at fc rate.

Despreaders 85

Each tracking unit contains a number of QPN despreaders 85. Each despreader 85 and each branch of the despreader 85 can have a different spreading factor.

Variable Amplifiers 87

A variable amplifier 87 is used as an actuator for the signal amplitude tracking. Each variable amplifier 87 (Vamp) can have a different gain. The output of the Vamps 87 are the soft symbols MD, MP, EP and LP which stands for Middle Data, Middle pilot, Early pilot and Late pilot. But when in Rake (UMTS mode), these signals have completely different meanings than these names suggest.

PN-code Generators 89

The PN-code generators 89 generate the complex PN-codes for the despreaders 85. This is a similar block as in the transmitter. It is possible to use a RAM, a Gold code generator or an external input.

The tracking unit 0 is equipped with, for example, four separate generators, wherein unit 1 and 2 have only one generator. The four despreaders in unit 1 and 2 use the same despreading code.

AED 91 and AGC 93

The AED 91 is the error detector for the signal amplitude tracking. The AGC 93 provides for a filtering on this signal and outputs the signal going to the variable amplifiers 87. The tracking unit 0 has a separate AED and AGC or each despreader in the tracking unit, while tracking unit 1 and 2 only have a common AED and AGC working on the MP signal.

PLL 70

The NCO of each tracking unit can be set by an external block like ARM software or can be controlled by the PLL. The PLL works on the MP signal. When the Rake is used, the PLL is turned off.

TED0, TED1 and DLL 97

The TED0 or TED1 are used as error detectors for the chip timing tracking. TED1 is used when the CCP is used as a signal source for the despreaders of the unit, while TED0 is used when a classic Early-Late correlator tracking is done. The output of the TED 91 goes to the DLLs and controlling the chip frequency of the interpolator.

Symbol Combiner (Not Shown)

When the three tracking units are used for tracking different multi-paths of the same signal, a hardware combination of the three CD outputs can be performed. Functionally, this is only an addition of the complex CD numbers. However, the symbol timing of CD[0], CD[1] and CD[2] will be different which will complicate tie coherent symbol combining.

Rake Receiver 101

Figure 14:
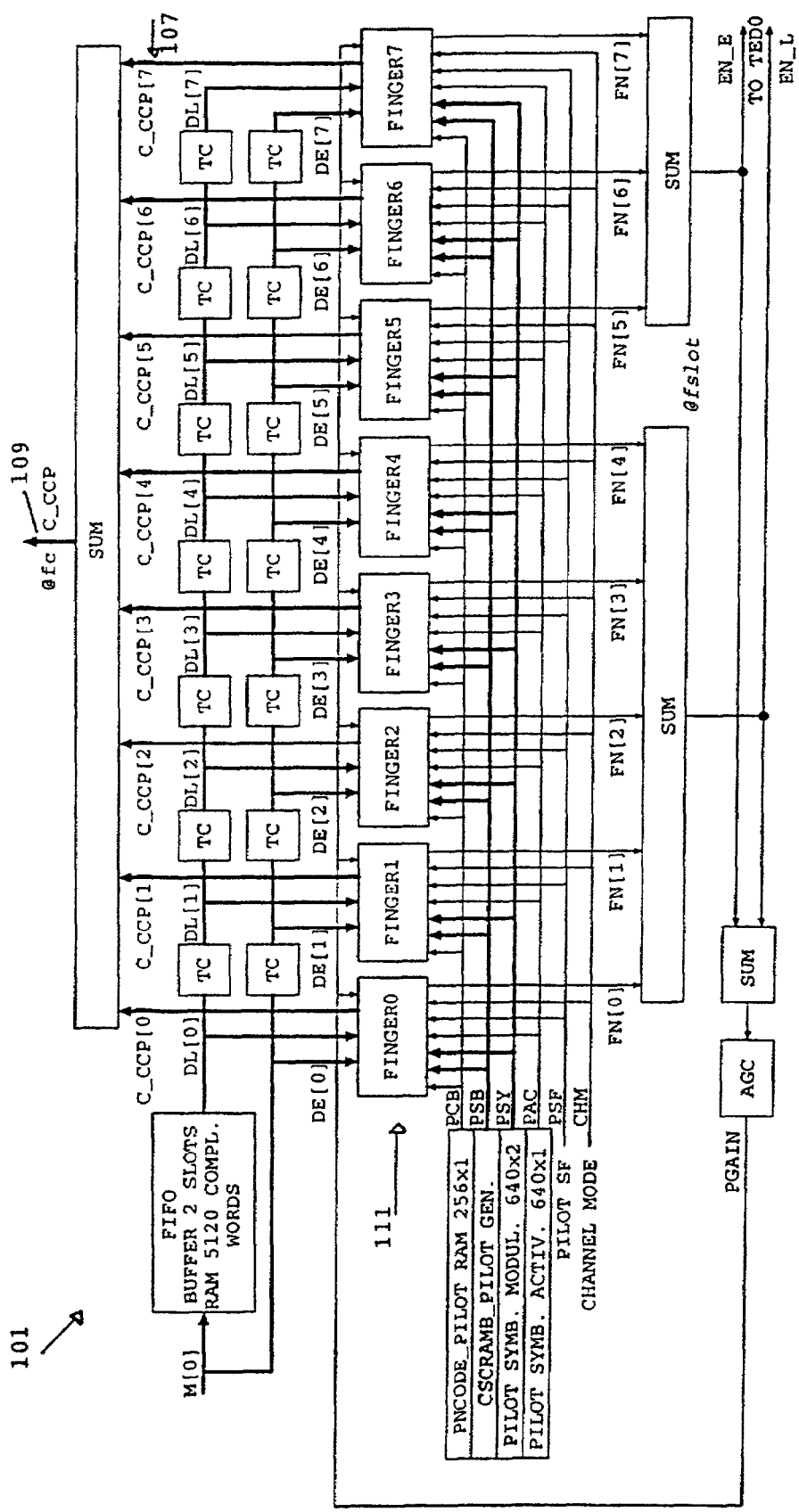
FIG. 14 represents one embodiment of a Rake receiver.

The Rake receiver 101 (FIG. 14) performs a weighted coherent combination of a plurality of taps selected on a delay line of the chip stream resulting in one new chip stream. To combine the taps weighted coherently, a channel estimation (amplitude, phase) of each of the delayed chip streams is made, as explained below in more detail.

Demodulator Using Rake

This section gives a detailed explanation on the use of the demodulator as a receiver where multi-path components are coherently combined at chip rate. The Rake block of the demodulator is only used in this mode and is also discussed in detail in this section. This specification is, for example, for reception of a UMTS waveform. A possible configuration of a demodulator for UMTS mode using only one tracking unit 90, is shown in FIG. 13.

The Rake-based demodulator configuration reuses almost everything from the tracking unit except for the PLL and PED. A large extra block that is not used when using Early-Late correlator tracking is the Rake 71. That is, the Rake-based demodulator includes the Rake that generates a new chip stream from the incoming chip stream and the classic descrambler 83, despreader 85 hardware.

Figure 13:
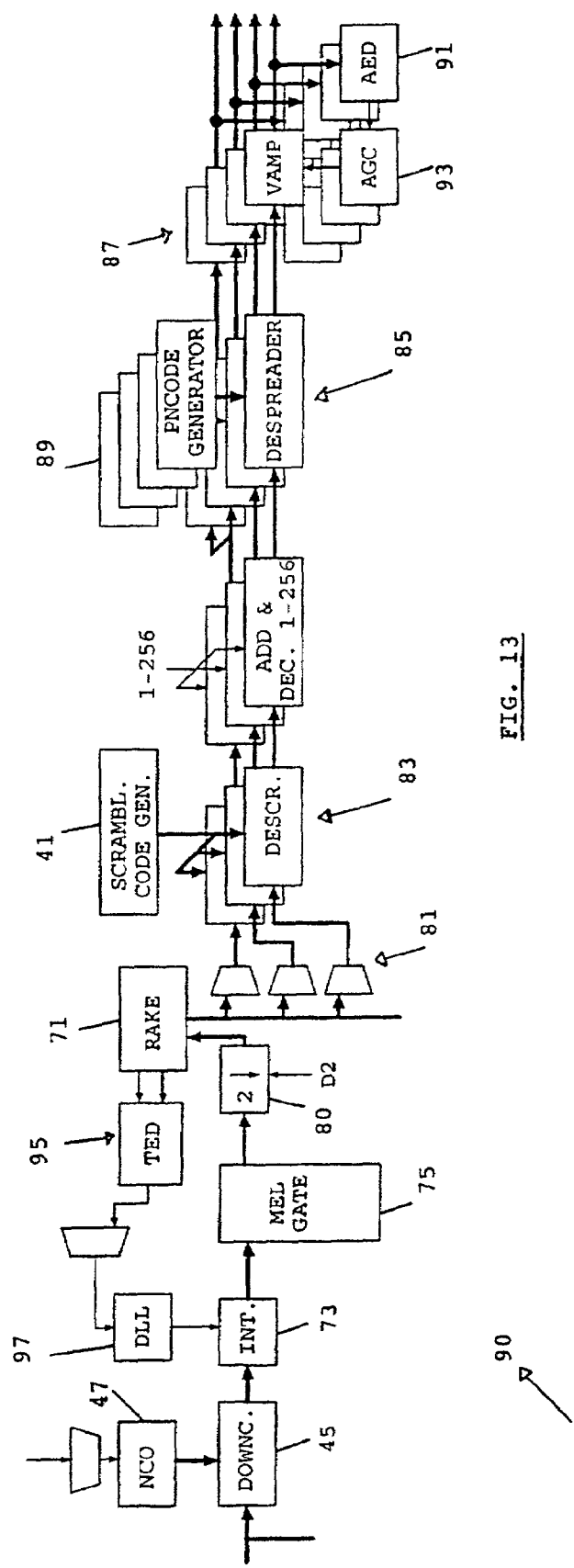
FIG. 13 represents one embodiment of a demodulator for UMTS mode, using only one tracking unit.

With the configuration shown in FIG. 13 it is possible to receive four QPN channels. These channels must be synchronous as they use the same Rake receiver. These four QPN channels must also have the same scrambling code. With tracking unit 1 and 2 and with Rake as input, two extra QPN channels with a different scrambling code are received. The extra QPN channels must still be synchronous with the other channels. To receive two asynchronous transmitters, the two demodulators must be used.

The only despreading in the Rake is the pilot symbol despreading used to make the channel estimations. Chip phase tracking is done by a timing error detector (TED0) and DLL working at slot rate.

Rake Overview

This part (FIG. 14) performs the coherent combination of a plurality chip streams 107 into one new chip stream 109. For example, eight fingers 111 are used, where a channel estimation is done for that chip phase with the aid of pilot symbols. This channel estimation is used to 'correct' the chip stream of the respective finger, after which all fingers can be combined. MRC with optional zero forcing is used to combine the different chip phases. The pilot symbols can have a SF from 4 to 256 and may be arbitrarily distributed over the slot.

Fingers 0 to 4 contribute to the Late multi-paths, fingers 5 to 7 to the Early multi-paths. Note that there is no real 'Middle' finger. This means that in the case of a single path, the correlation energy will be split over fingers 4 and 5 and one will never correlate at the 'top' of the correlation shape.

In one embodiment, the Rake is initialized so that the strongest peak is between fingers 4 and 5. With the phase controllable decimation (D2) the chip phase can be set with a resolution of ½ chip. Each finger has as inputs:

Pcb: codebit for despreading the pilot chip stream. The spreading code is stored in a RAM of 256 bits. This is a real signal, no QPN pilot is possible.

Psb: complex descrambling bits coming from the descrambling code generator.

Psy: data modulation on the pilot symbols. One can use a RAM to store the modulation of a complete slot, so one needs a RAM of 640×2 bits. When a higher SF is used not all 640 locations will be used. For example, with SF 256 only the first ten locations of the RAM will be used. pilot modulation can change on a slot-by-slot basis.

Pac: activity bit for pilot symbols. This eliminates the need for having the pilot portion as a continuous portion at the beginning of the slot. Again a RAM of 640×1 could be used.

Psf: The pilot SF.

Chm: channel mode parameter selects the algorithm to use to make the channel estimations. (slow fading: 0, fast fading: 1).

Other configuration inputs include: a threshold to decide on which finger there is a signal, filter coefficients for channel estimation filtering, etc. The RAMs of 640 bits could be smaller if it is not required to have a burst of pilot chips equal to four chips anywhere in the slot. For example, eight consecutive pilot symbols SF can be replaced by one pilot symbol with SF 32.

Each finger has a complex CCCP[x] output at chip rate. This is the delayed chip multiplied with the complex conjugate of the channel estimation of finger x. Each finger also has a FNx output at slot rate which is the energy of the coherent accumulation of all pilot chips/symbols in a slot of finger x. The sum of all FNx is calculated and goes to the pilot AGC. In this way, CCCP is not dependent on the pilot energy.

As there is fixed finger spacing, only a global DLL is needed. The DLL works on the slot rate. The Late and Early energies are calculated as:

$ENL = FN0 + FN1 + FN2 + FN3 + FN4$, $ENE = FN5 + FN6 + FN7$.

ENL and ENE go to the DLL which feeds backs to the interpolator at the input of the demodulator using the Rake filter.

Rake Finger 115

Figure 15:
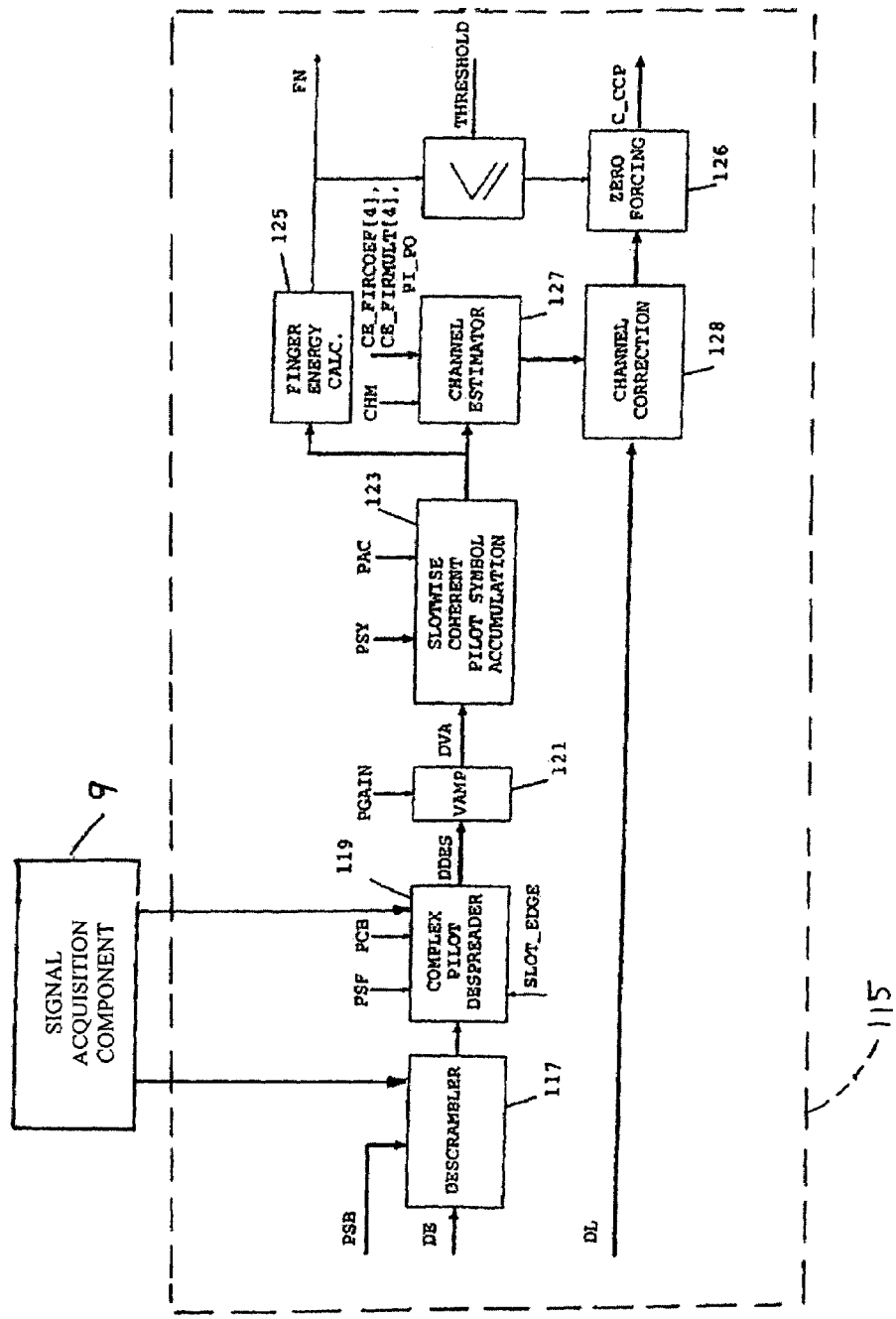
FIG. 15 represents one embodiment of a Rake finger.

This section describes the fingers architecture (see FIG. 15).

Descrambler 117

The incoming chips are descrambled with Psb. This code and its phase are common for all fingers. The phase has to be set during an acquisition process initializing the Rake via the signal acquisition component 9. The descrambler 117 has the same functionality as the other descramblers.

Complex Pilot Despreader 119

The complex signal coming from the descrambler 117 at the chip rate is despread with the pilot Pncode (Pcb), only one despreader, so the pilot must be a QPSK or BPSK signal. The pilot PNcode has a PNlength of Psf, wherein $4 <= Psf <- 256$, and k*Psf=2560 with k being a positive integer. The despreader 119 works continuously and is synchronized, via the signal acquisition component 9, to the slot edge at chip rate. This means that a new symbol starts at the start of the slot (slot-edge=1).

Variable Amplifier 121

The complex symbol coming from the despreader is sent through the variable amplifier (VAMP) 121. The complete CCMR has one global AGC which sets the Pgain at slot rate. For different spreading factors, the initial gain must be set to a different value, for example, to 1.0 for SF 256, and to 64.0 for SF 4.

Pilot Filter 123. Slot Wise Coherent Pilot Symbol Accumulation 124

Figure 16:
FIG. 16 represents one embodiment of a slotwise coherent pilot symbol accumulation.

In the pilot filter 123, a coherent pilot symbol accumulation 124 is done on a slot-by-slot basis. The Pac input defines if the symbol coming from the VAMP is a pilot symbol, as shown in FIG. 16. In this example, the Psf is 256, and Pac would be 111100000 . . . 0000.

Pi with i=0,1,2, . . . , the pilot symbol index, are the complex despread pilot symbols Dva (@fsymbB). In order to accumulate them coherently, the pilot modulation must be removed first. This modulation is known a priori and must be present at the Psy input. For QPSK Psy can take four values: +i, −j, +j, −1.

For QPN Psy can take two values: +1 and −1. So, Psy is represented by a 2-bit value (Psy[0] and Psy[1]).

The values Pi are then demodulated in the following way (Piu are the demodulated values of Pi)(u=unmodulated):

| Psy [0..1] | Pi | Piu |
| --- | --- | --- |
| 00 | Pii + j * Piq | Pii + j * Piq |
| 01 | Pii + j * Piq | −Piq + j * Pii |
| 10 | Pii − j * Piq | Piq − j * Pii |
| 11 | Pii + j * Piq | −Pii − j * Piq |

For QPN Psy must only take the values 00 or 11. Spj are the complex accumulations of these demodulated pilot symbols from the current slot, divided by the number of pilots (or multiplied by 1/number of pilot symbols): Sp=accumulation of Piu, divided by the number of pilot symbols.

This is equivalent to despreading over all the pilot chips in the slot in the case of unmodulated pilot symbols. Sp values are generated at slot rate fslot. The value is available at the end of the slot. This module is slot-synchronous.

Finger Energy Calculation 125

Figure 17:
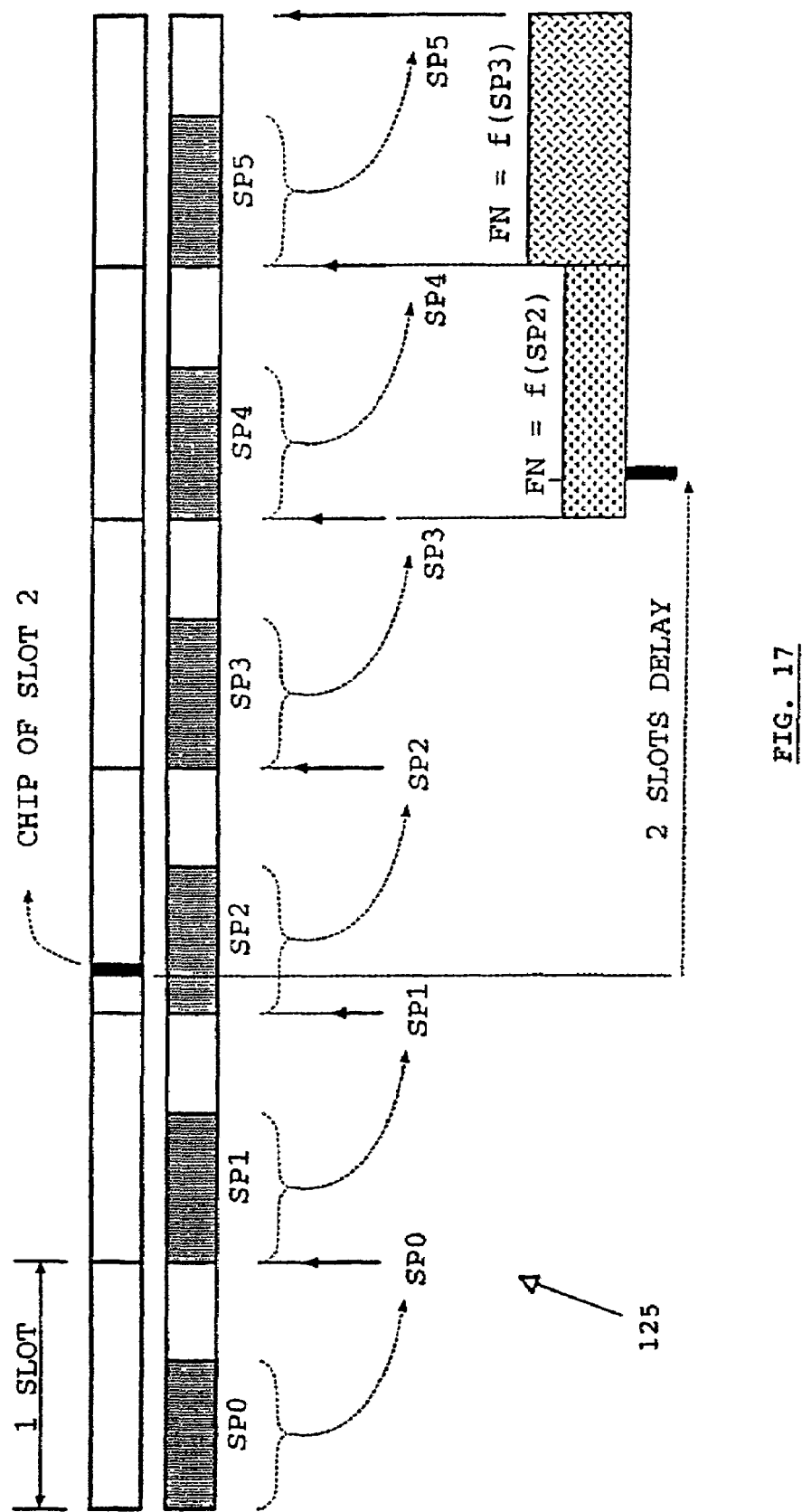
FIG. 17 represents one embodiment of a finger energy calculation.

Here, a measure for the finger energy is calculated slot by slot. Because there is a delay of two slots on the chips, the energy is calculated from a delayed Sp value. This is shown in FIG. 17. The energy is calculated as follows: $Sp\_i^2 + Sq\_q^2$. With a delay of one slot on Sp. This energy will be used for the DLL and zero forcing.

Channel Estimator 127

The channel estimator 127 performs a filtering or interpolation on the Sp values. The exact function to perform depends on the Chm (channel mode) input (fast or slow fading channels). The output of the channel estimator 127 is the channel estimation ces at the chip rate. When Chm=0, the Ce_FIRcoef[4] and Ce_FIRmult[4] inputs are needed. When Chm=1, the pipo input is needed.

Channel Mode 0: Slow fading 131

Figure 18:
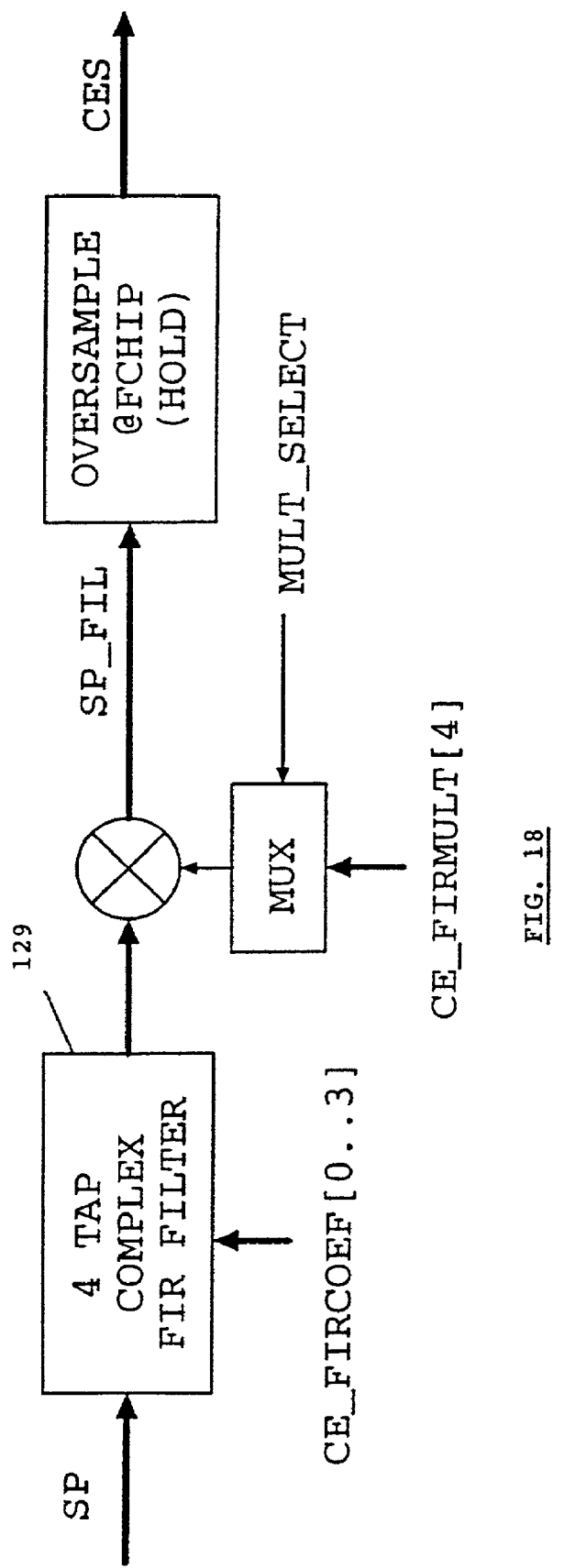
FIG. 18 represents one embodiment of a slot weighing filter for the communication device.

In this mode, ces is constant over a complete slot. ces is a filtered version of the incoming Sp values as indicated in FIG. 18. The multiplication after the filter is to have a FIR filter 129 with unity gain. To avoid a transient in the amplitude on the signal coming from the filter, four different values are stored for this gain. The first output of the filter gets gain CeFIRmult[0], the second output CeFIRmult[1], the third CeFIRmult[2] and CeFIRmult[3] is used on sample number 4 leaving the filter, and in steady state mode.

Figure 19:
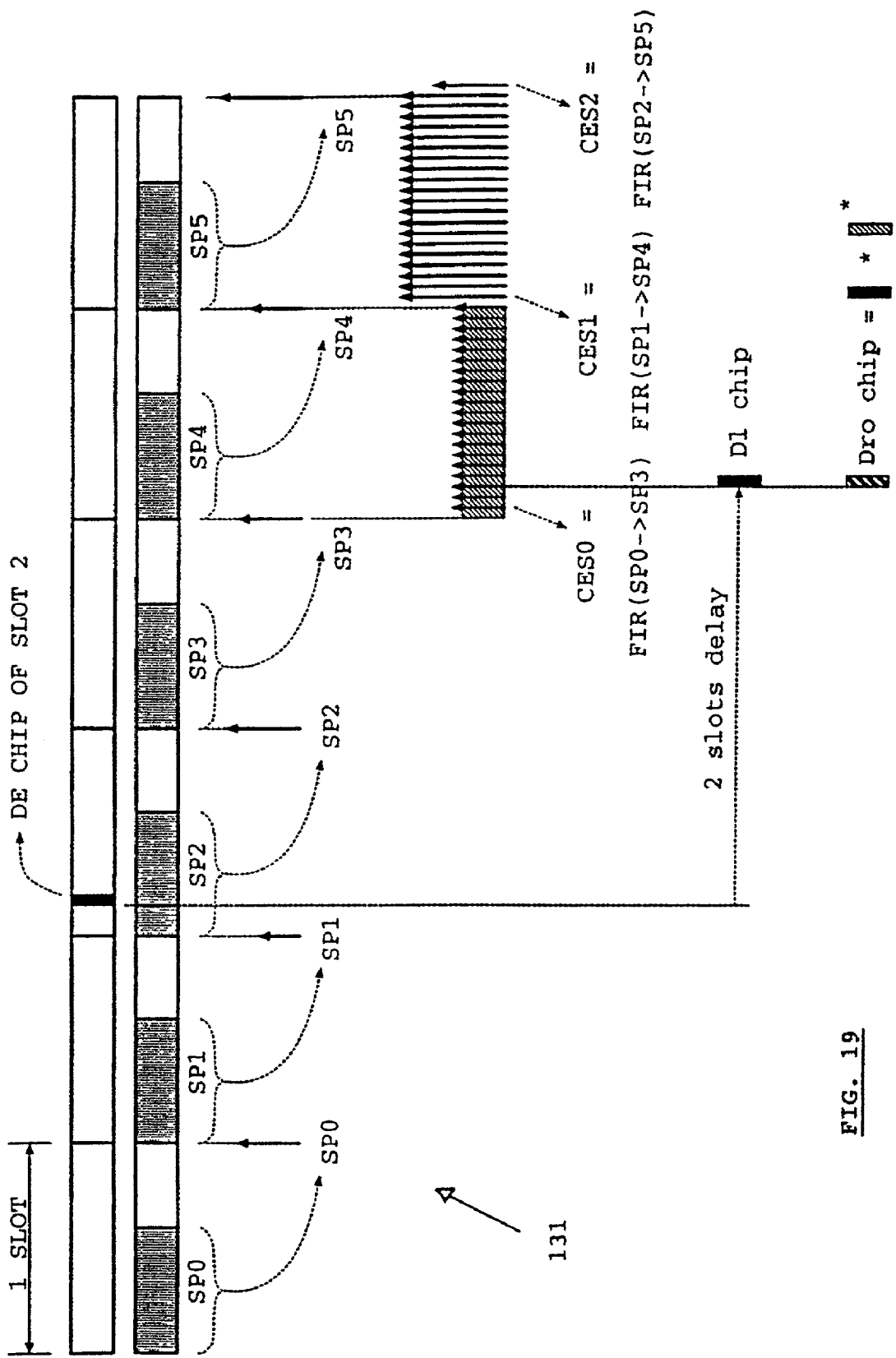
FIG. 19 shows an exemplary overview of a Rake finger process for Channel Mode 0.

All filter taps should be initialized to 0 at the start of the process. The filter and multiplier work at slot rate fslot, and ces are samples at chip rate. (Oversampling of filter output). FIG. 19 is an overview of the Rake finger process 131 in the case of channel mode 0.

The different pilot symbols are demodulated and coherently accumulated giving the values Sp0 to Sp5. The channel estimations ces are the output of the four taps FIR filter, ces0 is a function of Sp0 to Spa, and ces0 is constant over slot number 4. The De chip from slot 2 is delayed by two slots so that it is available with slot 4 as D1 chip. This chip is multiplied with the complex conjugate of ces0 to give the Dro chip of this finger.

The chip arriving in slot 2 is "corrected" with the information from the pilot symbols of the slot 0,1,2 and 3. Every chip is always corrected with the aid of the Before Before, Before, Present and After slot (unless some filter taps are set to 0). Channel estimations change only at slot rate. Note that Sp3 is generated together with the last chip of slot 3 while ces0, which is a function of Spa, is used for all chips of slot 4.

Channel Mode 1: Fast Fading 133 and 135

Figure 20:
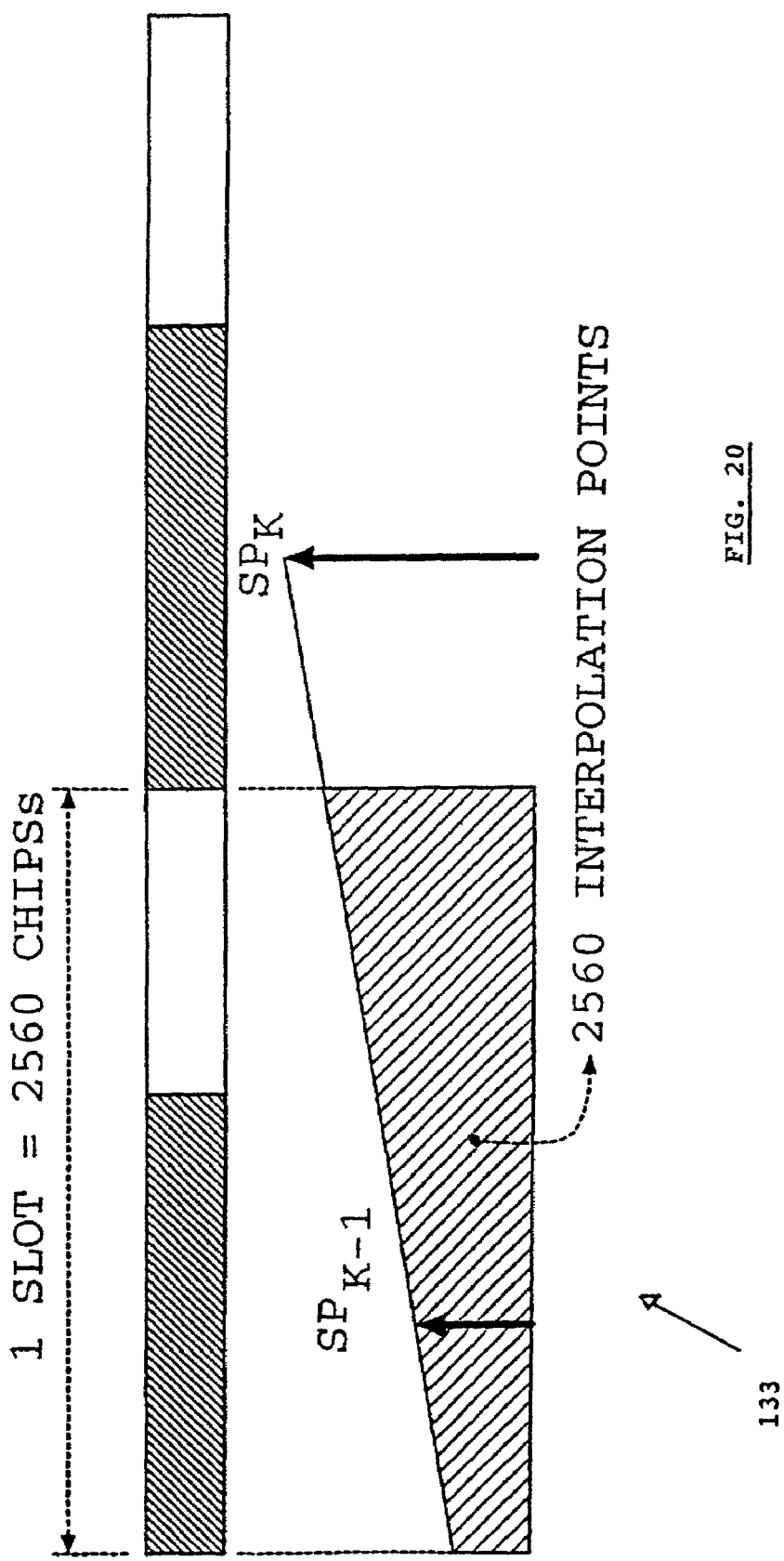
FIGS. 20 and 21 show an exemplary overview of a Rake finger process for Channel Mode 1.

In this mode, ces are interpolated values between the current and the previous Sp values entering the channel estimator. Thus, ces changes at chip rate, as shown in FIG. 20.

Figure 21:
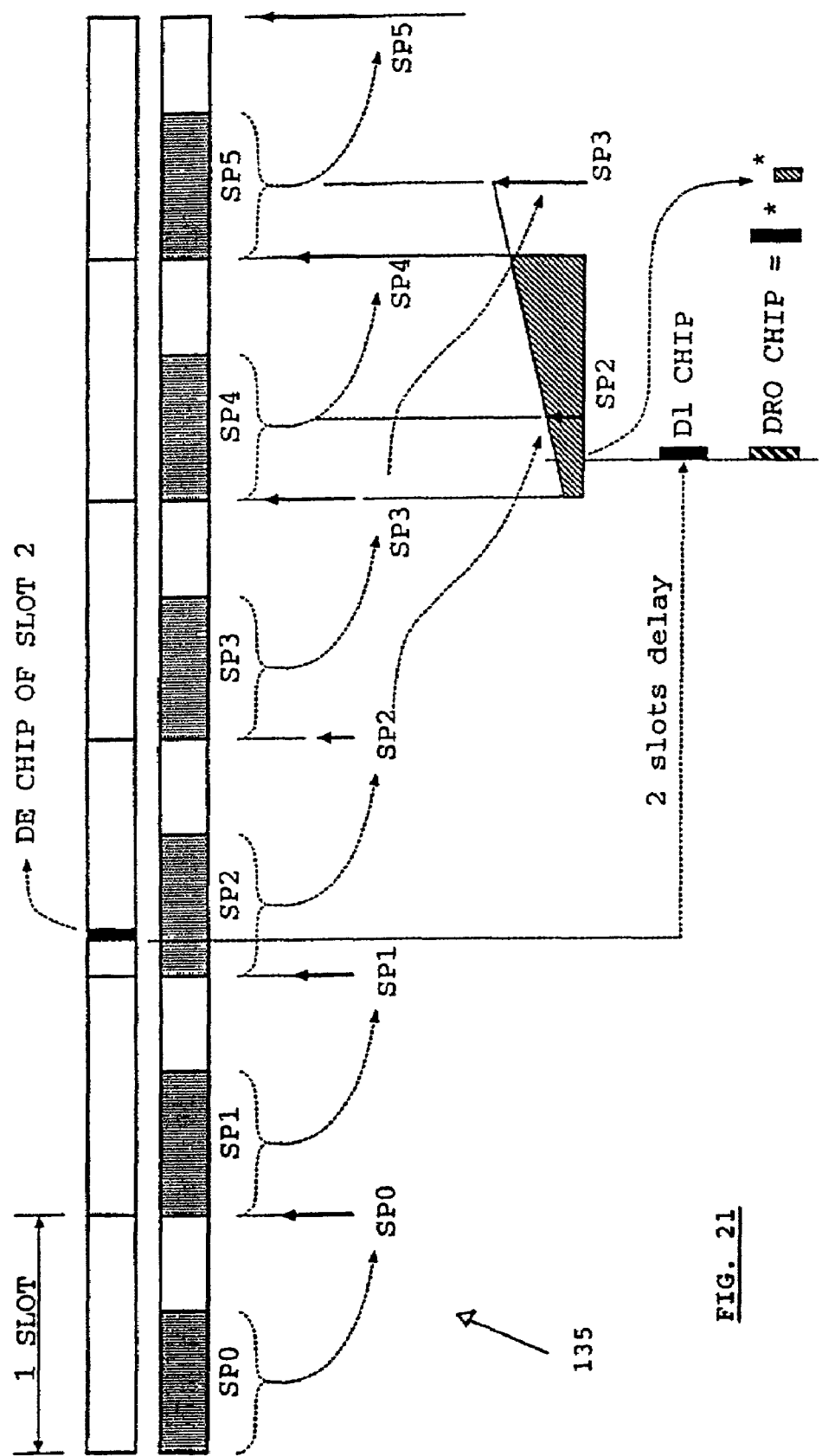

The incoming Sp values are positioned in the middle of the pilot portion to calculate the other complex values. The pipo (pilot position) input is used for this. It is an integer in the range [0:2559]. In FIG. 21, pipo would be 768 or 769 (3/5*2560/2).

Linear interpolation is performed on both real and imaginary part of the Sp values. In this way we go via a straight line in the complex plane from Sp(k−1) to Sp(k). That is:
Re[ces(i)]=(Re[Sp(k)]−Re[Sp(k−1)])*(i−pi_po)/2560+ Re[Sp(k−1)]
Im[ces(i)]=(Im[Sp(k)]−Im[Sp(k−1)])*(i−pi_po)/2560+ Im[Sp(k−1)], with i=0, 1, 2, . . . , 2559. The 2560 different chips in a slot. See FIG. 21 for an overview of the Rake finger process 135 in case of channel mode 1.

The different pilot symbols are demodulated and coherently accumulated giving the values Sp0 to Sp5. The channel estimations ces(i) for the chips i of slot 2 are calculated during slot 4 with the aid of Sp2 and Sp3. So, the Present and Future slot is used to make the channel estimates.

Channel Correction 128 (FIG. 15)

The channel correction 128 has as an input the delayed chips D1 coming from the FIFO and the channel estimations per chip ces. The function of the channel correction 128 is to correct for the channel phase of the finger and give a weight to the finger. The outputs from the different fingers can then be combined (coherently) in one signal. The following action is performed in these blocks: Dro=D1*ces(*), with ces(*) being the complex conjugates of ces.

Zero Forcing 126 (FIG. 15)

Each finger output can be forced to zero with the zf signal. The purpose of this is to set a finger to 0 when no (or very little) signal is present in that finger to avoid the accumulation of a lot of noise. The zf signal is obtained by comparing slot wise the FN and a programmable threshold, wherein zf is 1 if FN<=threshold.

What is claimed is:

1. A communication device for wideband code division multiple access (W-CDMA) signal transmission and reception, comprising:
   a W-CDMA transmitter comprising at least one of a first RAM and first registers arranged to store first parameters so as to configure the transmitter's operation;
   a W-CDMA receiver comprising at least one of a second RAM and second registers arranged to store second parameters so as to configure the receiver's operation;
   a signal acquisition component; and
   a processor in data communication with the W-CDMA transmitter, the W-CDMA receiver and the signal acquisition component, wherein the processor is configured to provide for software configuration of the first and second parameters;
   wherein the receiver comprises:
      a pulse shaping filter;
      a level control block configured to receive an output from the pulse shaping filter;
      a demodulator configured to receive an output from the level control block and track multi-path components received from a base station; and
      a reference demodulator configured to receive the output from the level control block and configured to estimate noise;
   wherein the demodulator comprises:
      a Rake filter producing a signal at a chip rate which is a coherent accumulation of channel corrected multipath components resulting from one base station; and a tracking unit using the signal at the chip rate for descrambling and despreading a plurality of waveform channels, wherein the Rake filter comprises:
a FIFO to buffer samples at the chip rate coming from the level control block;
a delay line containing a plurality of registers, an input of the delay line being connected to an output of the FIFO;
a plurality of finger blocks, inputs of the finger blocks being connected to programmable tap positions on the delay line; and
a summer of complex outputs of the finger blocks at a chip rate.

2. The communication device of claim 1, wherein the signal acquisition component comprises a hardware initial synchronization block which has at least one of reprogrammable parameters and reprogrammable algorithms.

3. The communication device of claim 1, wherein the processor controls at least one of the first RAM and the first registers, and the second RAM and the second registers.

4. The communication device of claim 1, wherein the W-CDMA transmitter comprises a first programmable pulse shaping filter, and wherein the receiver comprises a second programmable pulse shaping filter.

5. The communication device of claim 4, wherein the first pulse shaping filter and the second pulse shaping filter are programmable to perform GMSK filtering, and wherein the transmitter and receiver are configured to interface with a GSM front-end.

6. The communication device of claim 5, wherein the processor performs a protocol in accordance with a GSM protocol stack.

7. The communication device of claim 1, wherein the processor, the transmitter and the receiver are configured for waveform processing of signals in accordance with a predetermined format, wherein the predetermined format is one of the following: UMTS, Satellite UMTS, Galileo, GPS, IS-2000, IMT-2000, CDMA2000, IS-95, 3GPP, 3GPP2 and ARIB.

8. The communication device of claim 1, wherein the transmitter comprises at least one element which is one of the following: synchronization hardware to slave transmit start epochs to events external to the transmitter; a burst generator for realizing discontinuous transmissions; a quadrature pseudo-noise (QPN) channel containing one or more spreaders with a predetermined amplification of an output signal; a combiner to accumulate the QPN channel output signal; a PN code generator; a scrambling code generator; a scrambler; a combiner which accumulates a scrambling code output; a pulse shaping oversampling filter; and an NCO and upconverter for carrier precompensation.

9. The communication device of claim 8, wherein the PN code generator is configured as a RAM in which PN codes are downloaded under control of the processor.

10. The communication device of claim 8, wherein the scrambling code generator is configured as a programmable Gold Code generator.

11. The communication device of claim 8, wherein the QPN channel is configured to execute UMTS forward or return link transmission.

12. The communication device of claim 8, wherein an amplification of the spreader output is configured to perform a transmit power control.

13. The communication device of claim 1, wherein the transmitter comprises a time interpolator to perform sub-chip time alignments.

14. The communication device of claim 1, wherein the transmitter is configured for multi-code transmission.

15. The communication device of claim 1 wherein the receiver further comprises a downconverter connected to an input of the pulse shaping filter so as to interface at a front-end at an intermediate frequency.

16. The communication device of claim 1 wherein the receiver is configured to execute forward link and return link waveforms in accordance with a predetermined format, wherein the predetermined format is one of the following: UMTS, Satellite UMTS, Galileo, GPS, IS-2000, IMT-2000, CDMA2000, IS-95, 3GPP, 3GPP2 and ARIB.

17. The communication device of claim 1 wherein the level control block is included in a runtime control loop controlled by the processor.

18. The communication device of claim 1, wherein the finger blocks are respectively grouped in a first multipath group and a second multipath group, the Rake filter being configured to accumulate energies of the outputs of the first multipath group and the second multipath group, and to use the accumulated values to feed a time error detector of the a DLL used for time tracking.

19. The communication device of claim 1, wherein the Rake filter comprises memories to hold at least one of a spreading code for a channel correction pilot, a scrambling code for a channel correction pilot, a channel correction pilot symbol modulation, and a channel correction pilot symbol activities.

20. The communication device of claim 19, wherein the memories are controlled by the processor.

21. The communication device of claim 19, wherein the finger block comprises:
a channel correction pilot descrambler;
a channel correction pilot despreader connected to an output of the channel correction pilot descrambler;
a channel correction pilot filter connected to an output of the channel correction pilot despreader and performing a coherent channel correction pilot symbol accumulation over a programmable number of steps, and producing a weighted average on a programmable number of the coherent channel correction pilot symbol accumulation over a programmable number of steps;
a channel estimator connected to the channel correction pilot filter and generating a channel estimation at the chip rate and using outputs of the pilot filter;
a channel corrector connected to the channel estimator and performing a multiplication of an incoming stream with a complex conjugate of the channel estimation;
a calculator connected to the pilot filter and configured to calculate a slot energy;
a comparator connected to the calculator and configured to compare the slot energy with a programmable threshold; and
a circuit connected to the comparator and configured to force the channel estimation to zero if the threshold is not exceeded.

22. The communication device of claim 21, wherein the finger is configured for slow and fast fading compensation by programming the channel correction pilot filter for slow fading, the channel correction pilot filter performing a coherent accumulation over a slot, and performing a weighted average over previous-previous, previous, actual and next obtained slot values yielding a channel estimation per slot, which is applied by the channel corrector; and for fast fading, the channel correction pilot filter performing a coherent accumulation over a slot, and then deriving channel estimations through interpolating consecutive the coherent accumulations over a slot, yielding channel estimations with sub-symbol timing, which are applied by the channel corrector.

23. The communication device of claim 1 wherein the reference demodulator comprises an accumulator of programmable length of absolute values of samples at a chip rate, and a low pass filter operating on the accumulator output.

24. The communication device of claim 1 wherein the reference demodulator is included in a runtime control loop controlled by the processor.

25. The communication device of claim 1 wherein the demodulator is configured to perform satellite diversity.

26. The communication device of claim 1, wherein the device is configured to perform ranging measurements to geostationary satellites.

27. The communication device of claim 1, wherein the processor is in direct data communication with the signal acquisition component.

28. A communication device for wideband code division multiple access (W-CDMA) signal transmission and reception, comprising:
 a W-CDMA transmitter comprising at least one of a first RAM and first registers arranged to store first parameters so as to configure the transmitter's operation;
 a W-CDMA receiver comprising at least one of a second RAM and second registers arranged to store second parameters so as to configure the receiver's operation;
 a signal acquisition component; and
 a processor in data communication with the W-CDMA transmitter, the W-CDMA receiver and the signal acquisition component, wherein the processor is configured to provide for software configuration of the first and second parameters;
wherein the receiver comprises:
 a pulse shaping filter;
 a level control block configured to receive an output from the pulse shaping filter;
 a demodulator configured to receive an output from the level control block and track multi-path components received from a base station; and
 a reference demodulator configured to receive the output from the level control block and configured to estimate noise;
wherein the level control block comprises:
a programmable shifter configured to receive an input from the pulse shaping filter and to perform coarse grain dynamic control;
a programmable multiplier configured to receive an input from the shifter and to perform fine grain dynamic control;
a first overflow counter configured to receive an input from the multiplier and to operate on a most significant bit and a second most significant bit;
a second overflow counter configured to receive an input from the multiplier and to operate on the second most significant bit and a third most significant bit; and
a saturation logic configured to receive an input from the multiplier and to operate to limit the input received from the multiplier.

* * * * *

UNITED STATES PATENT AND TRADEMARK OFFICE
CERTIFICATE OF CORRECTION

PATENT NO. : 7,386,005 B2 Page 1 of 1
APPLICATION NO. : 09/992669
DATED : June 10, 2008
INVENTOR(S) : Lugil et al.

It is certified that error appears in the above-identified patent and that said Letters Patent is hereby corrected as shown below:

On the title page, item (75), in "Inventors", in column 1, line 7, delete "Wijgntaal" and insert -- Wijgmaal --, therefor.

In column 18, line 14, in Claim 17, delete "ioop" and insert -- loop --, therefor.

In column 18, line 21, in Claim 18, after "of" delete "the".

Signed and Sealed this

Twenty-third Day of September, 2008

JON W. DUDAS
*Director of the United States Patent and Trademark Office*